(12) United States Patent
Jurion et al.

(10) Patent No.: US 7,643,687 B2
(45) Date of Patent: Jan. 5, 2010

(54) ANALYSIS HINTS

(75) Inventors: Benoit Jules Jurion, Seattle, WA (US);
Gavin M. Gear, Bothell, WA (US);
Jamie N. Wakeam, Redmond, WA (US);
Timothy H. Kannapel, Bellevue, WA (US); Todd M. Landstad, Redmond, WA (US); Sebastian Poulose, Sammamish, WA (US); Zoltan C. Szilagyi, Bellevue, WA (US); Lidia Schwarz, Redmond, WA (US); Roman Snytsar, Redmond, WA (US); Sashi Raghupathy, Redmond, WA (US);
Subha Bhattacharyay, Bellevue, WA (US); Richard J. Duncan, Kirkland, WA (US); Terri Chudzik, Seattle, WA (US);
Amber P. Race, Seattle, WA (US);
Jerome J. Turner, Redmond, WA (US);
Haiyong Wang, Bellevue, WA (US);
Herry Sutanto, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 907 days.

(21) Appl. No.: 11/083,106

(22) Filed: Mar. 18, 2005

(65) Prior Publication Data
US 2006/0210173 A1 Sep. 21, 2006

(51) Int. Cl.
*G06K 9/72* (2006.01)
(52) U.S. Cl. .................. 382/229; 345/469; 382/186; 382/187

(58) Field of Classification Search ............... 345/173, 345/179, 467, 468, 469; 382/186–189, 229, 382/309, 311, 313; 715/201, 209, 764
See application file for complete search history.

(56) References Cited

U.S. PATENT DOCUMENTS

| | | | | |
|---|---|---|---|---|
| 5,463,696 | A * | 10/1995 | Beernink et al. | 382/186 |
| 5,500,937 | A * | 3/1996 | Thompson-Rohrlich | 715/764 |
| 5,596,350 | A * | 1/1997 | Capps et al. | 345/173 |
| 5,671,438 | A * | 9/1997 | Capps et al. | 715/234 |
| 5,680,480 | A * | 10/1997 | Beernink et al. | 382/187 |
| 5,982,387 | A * | 11/1999 | Hellmann | 345/469 |
| 6,424,743 | B1 * | 7/2002 | Ebrahimi | 382/189 |
| 6,563,494 | B1 * | 5/2003 | Eichstaedt et al. | 345/179 |
| 6,651,218 | B1 * | 11/2003 | Adler et al. | 715/209 |
| 6,662,340 | B2 * | 12/2003 | Rawat et al. | 715/236 |
| 6,914,975 | B2 * | 7/2005 | Koehler et al. | 379/265.05 |
| 7,174,328 | B2 * | 2/2007 | Stanoi et al. | 707/3 |
| 7,210,130 | B2 * | 4/2007 | Fairweather | 717/136 |
| 2002/0190965 | A1 * | 12/2002 | Lemon | 345/179 |
| 2004/0019587 | A1 * | 1/2004 | Fuh et al. | 707/2 |
| 2004/0263878 | A1 * | 12/2004 | McElvain | 358/1.9 |
| 2006/0080102 | A1 * | 4/2006 | Roy et al. | 704/260 |
| 2006/0210173 | A1 * | 9/2006 | Jurion et al. | 382/229 |

* cited by examiner

*Primary Examiner*—Gregory M Desire
(74) *Attorney, Agent, or Firm*—Woodcock Washburn LLP

(57) ABSTRACT

A system and method for assisting with analysis and recognition of ink is described. Analysis hints may be associated with a field. The field may receive electronic ink. Based on the identity of the field and the analysis hint associated with it, at least one of analysis and recognition of ink may be assisted.

34 Claims, 20 Drawing Sheets

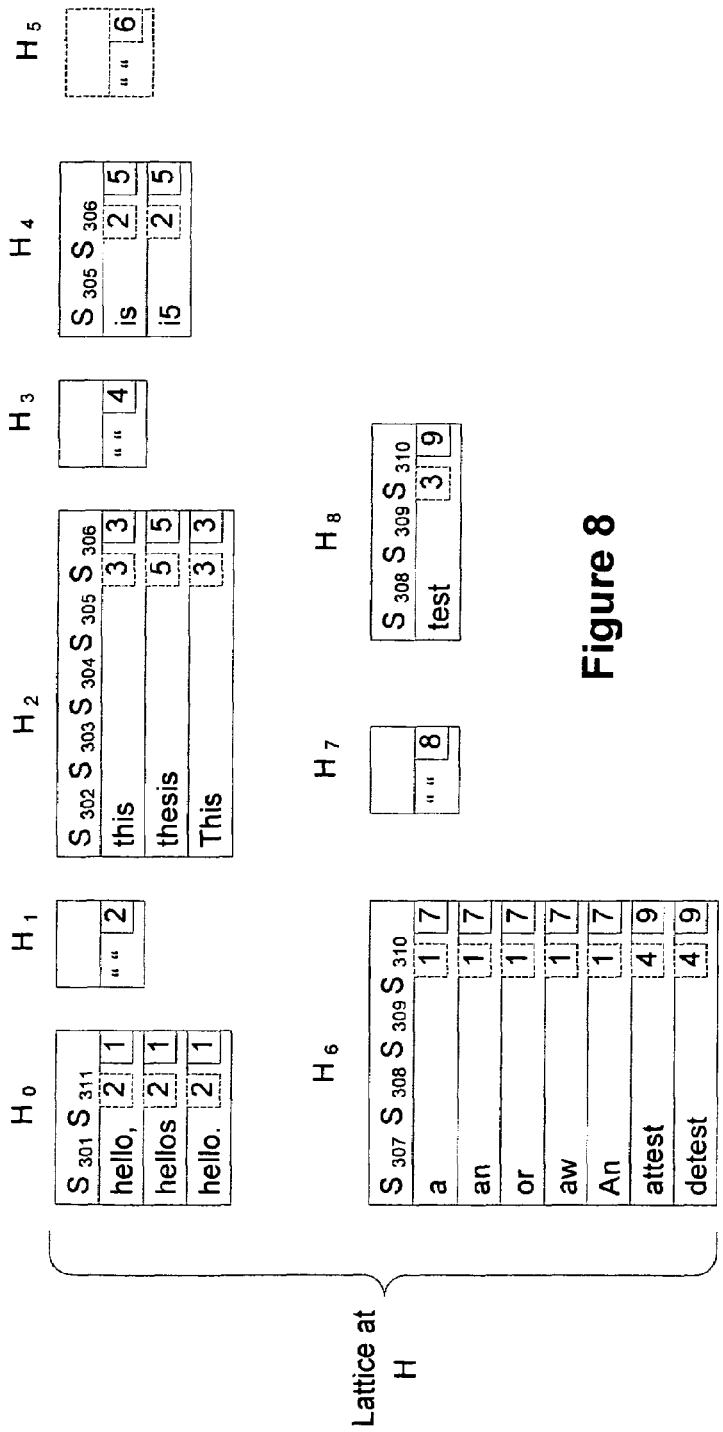

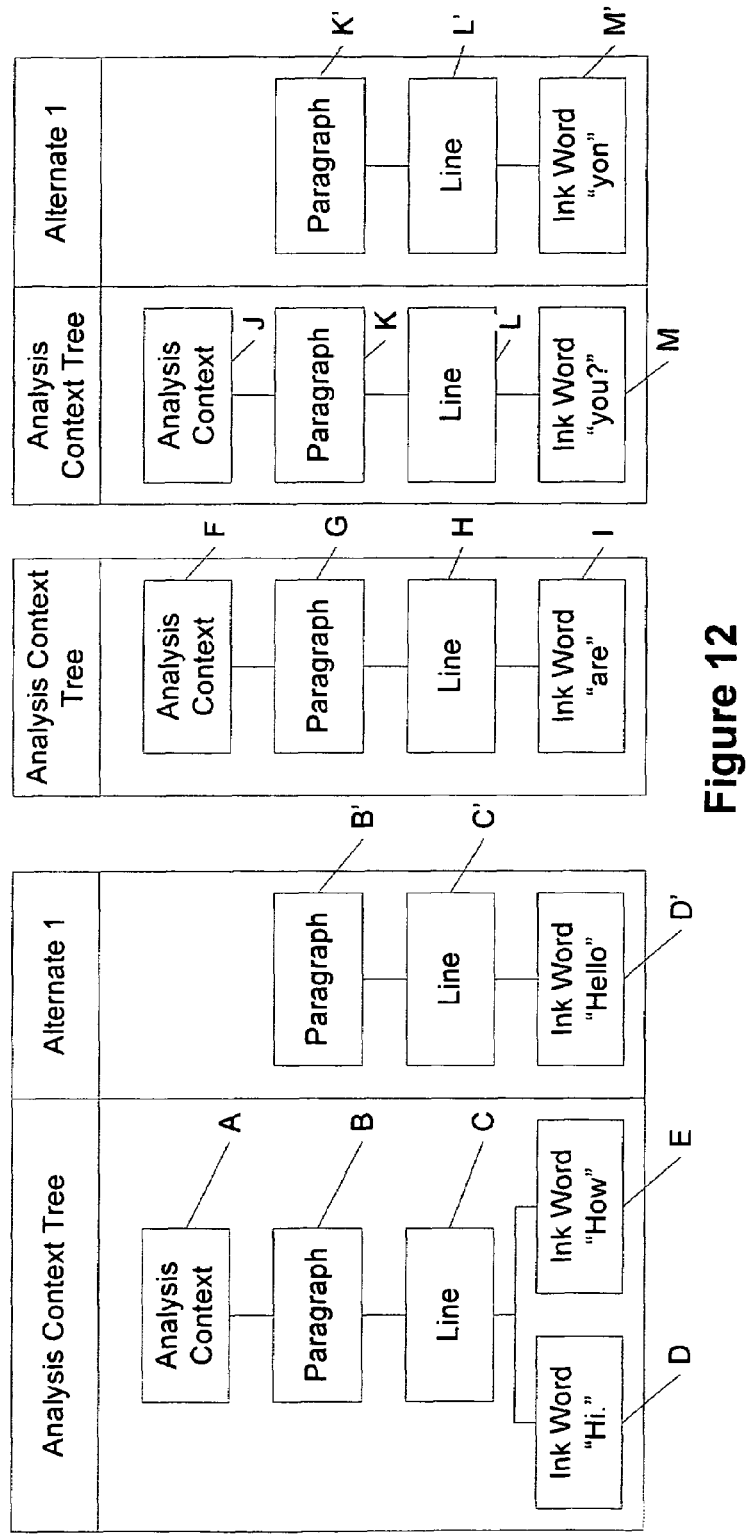

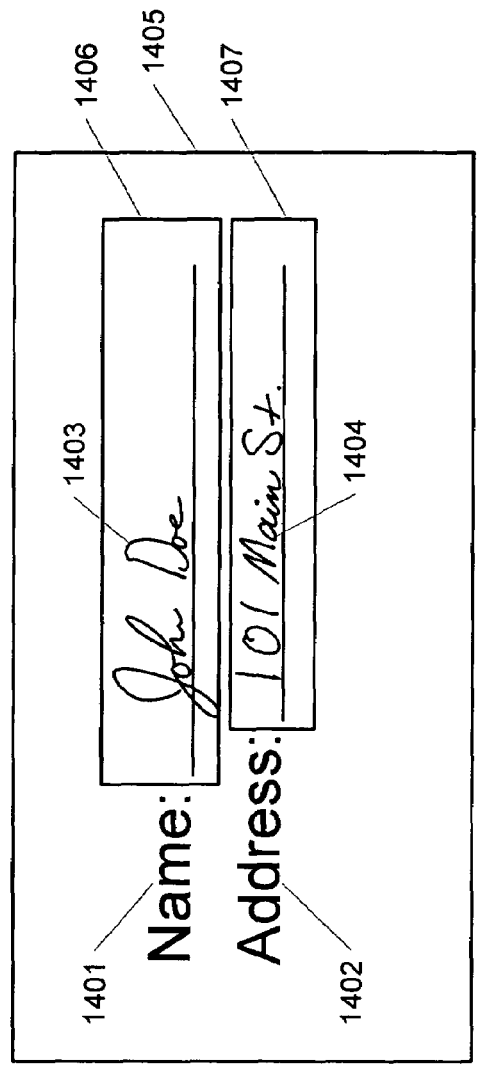

Figure 18

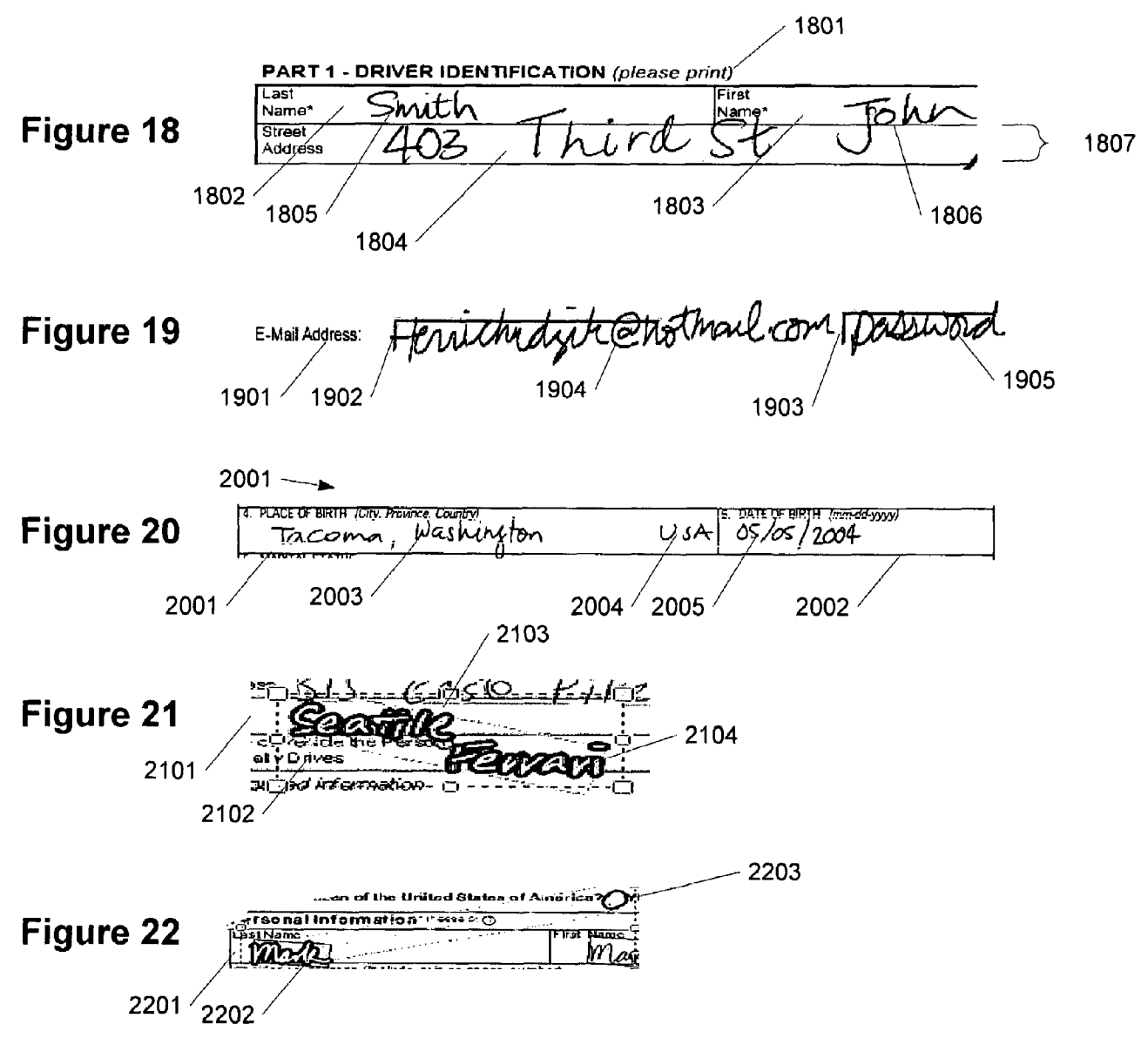

PART 1 - DRIVER IDENTIFICATION *(please print)*

| Last Name* | Smith | First Name* | John |
|---|---|---|---|
| Street Address | 403 Third St | | |

E-Mail Address: *hmidyt@hotmail.com/password*

4. PLACE OF BIRTH *(City, Province, Country)* | 5. DATE OF BIRTH (mm-dd-yyyy)
Tacoma, Washington | USA | 05/05/2004

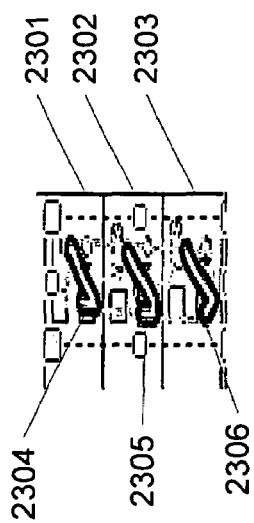
Figure 23
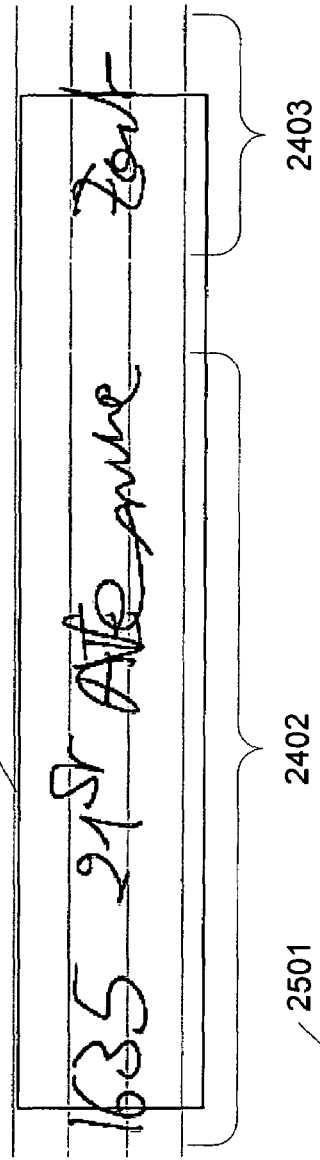
Figure 24
Figure 25
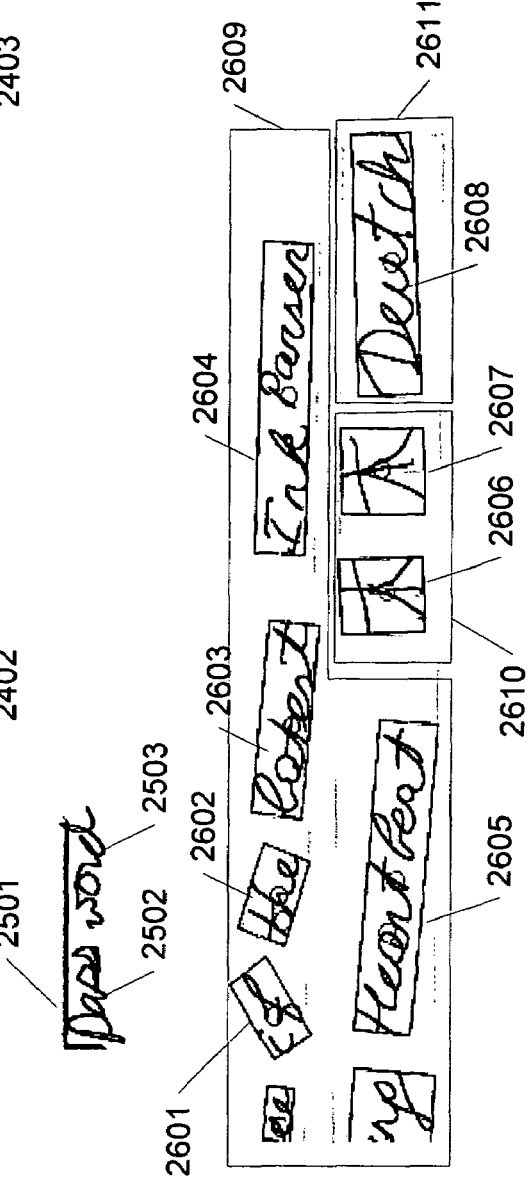
Figure 26

ANALYSIS HINTS

BACKGROUND OF THE INVENTION

1. Field of the Invention

Aspects of the present invention relate to computing systems. More particularly, aspects of the present invention relate to providing hints for handwriting recognition.

2. Description of Related Art

In addition to working with text, computers now have the ability to record and modify electronic ink. The electronic ink may be kept in its native form or may be recognized as text. Recognition of electronic ink is not always perfect. The recognition process may vary based on the legibility of a person's handwriting in addition to the context in which the person is writing.

Computing systems provide alternates to users such that a user may select which recognition result is correct for received handwriting. However, conventional representations of alternates do not address complex representations of electronic ink. For instance, conventional representations of alternates are limited to analyzing a single line or few lines of electronic ink. Computing systems did not account for contextual value of electronic ink extending beyond five or so lines.

Also, similar handwriting may have different meaning based on the context of the area in which someone is writing.

A system is needed that uses information relating to an input region to improve recognition.

BRIEF SUMMARY OF THE INVENTION

Aspects of the present invention address one or more of the problems described above, thereby improving recognition results based on knowledge of expected content to be entered.

BRIEF DESCRIPTION OF THE DRAWINGS

The present invention is illustrated by way of example and not limited in the accompanying figures.

FIGS. 8-9 show lattices in accordance with aspects of the present invention.

FIG. 11 shows electronic ink in accordance with aspects of the present invention.

FIGS. 12 shows context trees and alternates in accordance with aspects of the present invention.

FIGS. 13-14 and 16 show input regions and associated analysis hints in accordance with aspects of the present invention.

FIGS. 18-28 show examples of analysis hints aiding in handwriting analysis in accordance with aspects of the present invention.

DETAILED DESCRIPTION OF THE INVENTION

Figure 1A:
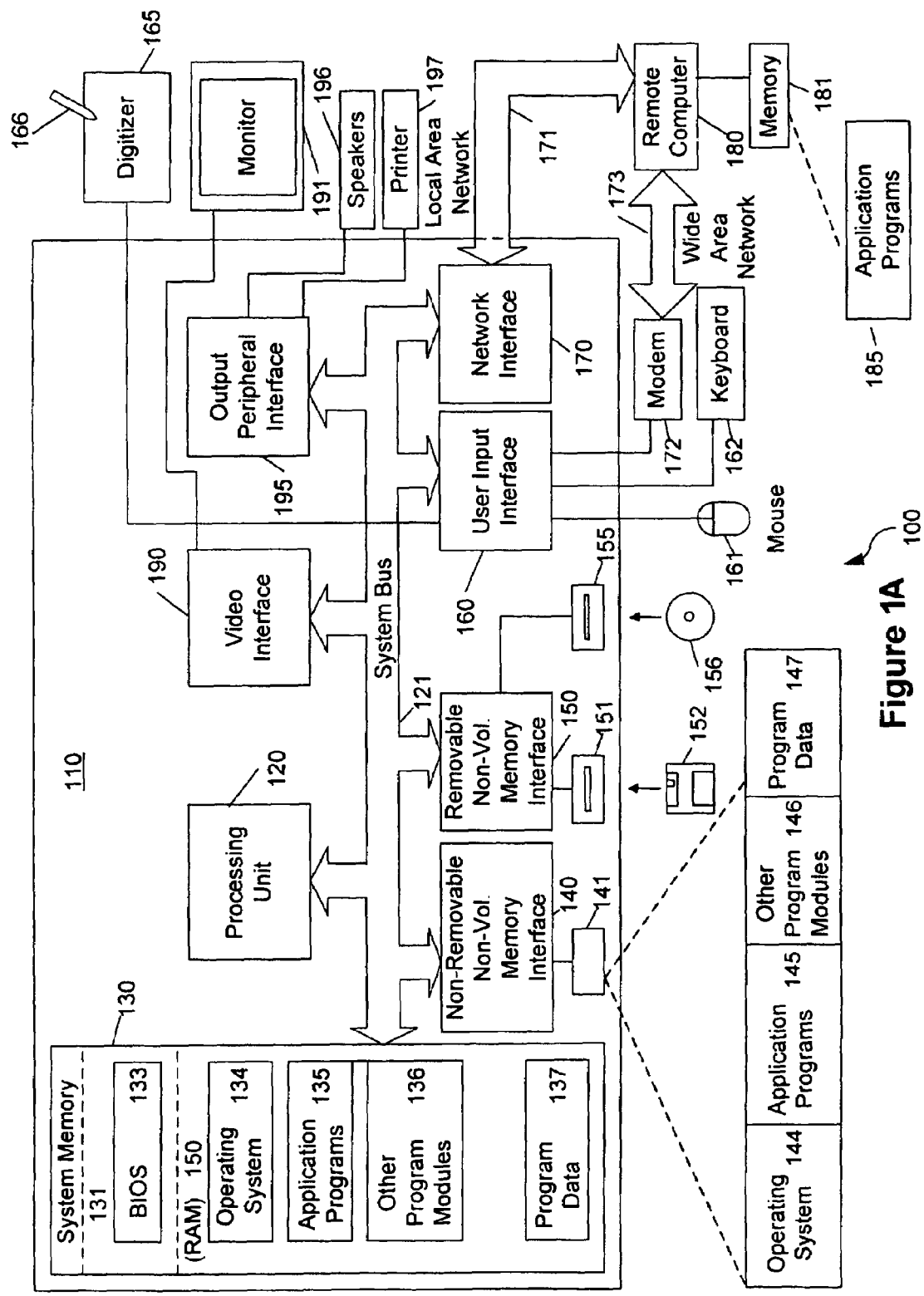
FIG. 1A illustrates a schematic diagram of a general-purpose digital computing environment in which certain aspects of the present invention may be implemented.

Aspects of the present invention relate to providing hints to handwriting recognition engine so as to more accurately recognize a user's handwriting. The hints may be associated with input regions. In some embodiments, the hints may be associated with a form. In other embodiments, the hints may be part of a context tree representing received handwritten ink.

This document is divided into sections to assist the reader. These sections include:

overview, characteristics of ink, terms, general-purpose computing environment, representation of alternates, objects and object relationships, application programming interfaces, lattice creation, and analysis hints.

It is noted that various connections are set forth between elements in the following description. It is noted that these connections in general and, unless specified otherwise, may be direct or indirect and that this specification is not intended to be limiting in this respect.

Overview

According to various examples of the invention, hints may be provided to a recognition engine. The hints may help in the analysis of a user's handwriting. The hints may take various forms. In some instances, the hints may be tied to a database of known values (names in a company address book) or to expected types of characters (numbers only). The hints may be associated with received ink alone. Alternatively, the hints may be stored as part of a tree that describes the content of a document.

With respect to a tree structure, the structure may include both electronic ink and textual representations of the ink. The tree may also contain non-ink content, including but not limited to native text, text recognized from ink, text recognized from speech, drawings, pictures, charts, presentations, spreadsheets, mathematical equations, musical notations, audio and/or video clips, and other information. As the textual representations may vary based on context and legibility of a person's handwriting, alternate representations of the textual information may also be included in the tree structure. Aspects of the present invention include representation of the tree structure through the use of one or more lattices with alternate recognition results.

Using a data structure relating to the context of the received ink (with possible recognition results stored therein) the tree structure, a software operating system or application may readily traverse the data structure and obtain alternates when needed. The data structure may define various elements in a document. For instance a node in the data structure may correspond to an ink stroke, and may further classify that ink stroke as either a text ink stroke or a drawing ink stroke. The alternates may be modified in order by the hint associated with an input region.

The data structure may be represented as a tree structure. Of course, other data structures may be used as well (including but not limited to one or more tables, databases, directed acyclic graphs and the like).

This type of data structure may also associate document elements into meaningful groups, such as words, lines and paragraphs. Thus, if a software application maintains a tree structure that describes a paragraph of handwritten electronic ink, the leaf nodes may associate individual strokes of electronic ink with word nodes corresponding to the words in the paragraph. The tree structure may then associate the word nodes with line nodes corresponding to lines in the paragraph. Each line node may then be associated with a node corresponding to the paragraph. Further, a software operating system or application may maintain a tree or other data structure that associates a node corresponding to an electronic ink stroke with a recognition result. These data structures thus can be used to both define relationships between associated electronic ink strokes and improve the handling of alternate recognition results of the ink.

Yet another node may be an analysis hint itself. One can then cross link the hint to the recognition result and the result to the hint. Thus, one can query the hint to obtain ink or recognition results associated with the hint. Similarly, one can query ink strokes to determine recognition results as being associated with an analysis hint.

As described below, these data structures can be used with an ink analysis tool according to various examples of the invention to analyze electronic ink in a document. According to various examples of the invention, a software operating system or application may obtain an analysis of electronic ink within a document by first creating a data structure for a document. The data structure describes the relationship between document elements that have already been analyzed, and thus provides the context in which the new electronic ink will analyzed. Document elements may include non-ink elements including, for instance, an input field in a form where users are requested to write. This data structure or "ink analyzer object" also includes the new electronic ink that has not been analyzed. That is, the ink analyzer object also includes electronic ink for which a relationship with other documents elements has not been established. The analysis hints may then be used to help the recognizer more accurately recognize the ink.

At least two operations may be performed on received ink. The first operation is a layout analysis and writing/drawing classification process that analyzes the received ink and creates a tree structure. The second operation is a recognition process that recognizes electronic ink and returns text values for recognized ink from the tree structure, with the lattice including alternate recognitions of the electronic ink. Other operations may be performed on the received ink as well and are not limited to the analysis and recognizing processes described here. For example, layout analysis and writing/drawing classification determines a local grouping of strokes. Recognition determines what words in a language (or shapes or other types of data) the strokes represent.

Recognition alternates may be associated with the lattice and forwarded along with parent documents or other files. Alternatively, the lattice and alternative recognition results may be created anew on each computing system. The results of the recognition operation are stored in a data structure. One embodiment of the data structure may be a lattice. Multiple lattice structures may be contained within an ink analysis structure as a tree of context nodes. When ink is persisted in a storage structure (for instance, ink serialized format or any other ink storage structure), one may include a persisted form of the ink analyzer which may or may not include recognition results. The recognition results, in one form as a lattice, may include text values for recognized ink and alternate recognition values. If one includes the recognition results, the stored recognition results may be exchanged between machines, thereby allowing a machine that does not have a recognizer the ability to modify which alternates are chosen for recognition results Thus, the lattice and alternates, once in existence, may be used on machines with and without recognizers. This ability may further support the extensibility of recognition results to all machines, irrespective of whether downstream machines have the ability to recognize ink or other inputs.

Lattice elements may be entities within the lattice that store (or at least reference) data. The data in the lattice elements are not limited to text. Lattice elements may include or reference any number of recognizable entities including but not limited to recognized ink, unrecognized ink, typed-in text, a mathematical equation, musical notations, and the like. For instance, if one was using a math recognizer, each one of the elements may have math XML (or the like) as the value of each element. Different elements may still reverence specific strokes and the next column, but the data is not limited to plain text.

Characteristics of Ink

As known to users who use ink pens, physical ink (the kind laid down on paper using a pen with an ink reservoir) may convey more information than a series of coordinates connected by line segments. For example, physical ink can reflect pen pressure (by the thickness of the ink), pen angle (by the shape of the line or curve segments and the behavior of the ink around discreet points), and the speed of the nib of the pen (by the straightness, line width, and line width changes over the course of a line or curve). Further examples include the way ink is absorbed into the fibers of paper or other surface it is deposited on. These subtle characteristics also aid in conveying the above listed properties. Because of these additional properties, emotion, personality, emphasis and so forth can be more instantaneously conveyed than with uniform line width between points.

Electronic ink (or ink) relates to the capture and display of electronic information captured when a user uses a stylus-based input device. Electronic ink refers to a sequence or any arbitrary collection of strokes, where each stroke is comprised of a sequence of points. The strokes may have been drawn or collected at the same time or may have been drawn or collected at independent times and locations and for independent reasons. The points may be represented using a variety of known techniques including Cartesian coordinates (X, Y), polar coordinates (r, Θs), and other techniques as known in the art. Electronic ink may include representations of properties of real ink including pressure, angle, speed, color, stylus size, and ink opacity. Electronic ink may further include other properties including the order of how ink was deposited on a page (a raster pattern of left to right then down for most western languages), a timestamp (indicating when the ink was deposited), indication of the author of the ink, and the originating device (at least one of an identification of a machine upon which the ink was drawn or an identification of the pen used to deposit the ink) among other information.

Among the characteristics described above, the temporal order of strokes and a stroke being a series of coordinates are primarily used. All other characteristics can be used as well.

| Terms | |
|---|---|
| Term | Definition |
| Ink | A sequence or set of strokes with properties. A sequence of strokes may include strokes in an ordered form. The sequence may be |

| Term | Definition |
|---|---|
| | ordered by the time captured or by where the strokes appear on a page or in collaborative situations by the author of the ink. Other orders are possible. A set of strokes may include sequences of strokes or unordered strokes or any combination thereof. Further, some properties may be unique to each stroke or point in the stroke (for example, pressure, speed, angle, and the like). These properties may be stored at the stroke or point level, and not at the ink level. |
| Ink object | A data structure storing ink with or without properties. |
| Stroke | A sequence or set of captured points. For example, when rendered, the sequence of points may be connected with lines. Alternatively, the stroke may be represented as a point and a vector in the direction of the next point. In short, a stroke is intended to encompass any representation of points or segments relating to ink, irrespective of the underlying representation of points and/or what connects the points. |
| Document | Any electronic file that has a viewable representation and content. A document may include a web page, a word processing document, a note page or pad, a spreadsheet, a visual presentation, a database record, image files, and combinations thereof. |
| Tree of Context Nodes | A data structure that describes the relationship between document elements that have already been analyzed and document elements that have yet to be analyzed. The data structure may optionally further include non-ink information (e.g., typed text, images, charts, and the like). This non-ink information may be used to aid in the recognition and/or analysis of the ink content. Further, the non-ink content may be annotated by the ink when an annotation engine is used. Because new content is availed to existing content, the existing content provides a context for the new information. |
| Render or Rendered or Rendering | The process of determining how information (including text, graphics, and/or electronic ink) is to be displayed, whether on a screen, printed, or output in some other manner. |
| Computer-readable medium | Any available media that can be accessed by a user on a computer system. By way of example, and not limitation, "computer-readable media" may include computer storage media and communication media. "Computer storage media" includes volatile and nonvolatile, removable and non-removable media implemented in any method or technology for storage of information, such as computer-readable instructions, data structures, program modules or other data. |
| Computer storage media | "Computer storage media" includes, but is not limited to, RAM, ROM, EEPROM, flash memory or other memory technology; CD-ROM, digital versatile disks (DVD) or other optical storage devices; magnetic cassettes, magnetic tape, magnetic disk storage or other magnetic storage devices; or any other medium that can be used to store the desired information and that can be accessed by a computer. |
| Communication media | "Communication media" typically embodies computer-readable instructions, data structures, program modules or other data in a modulated data signal, such as a carrier wave or other transport mechanism, and includes any information delivery media. |
| Modulated data signal | The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared and other wireless media. Combinations of any of the above should also be included within the scope of "computer-readable media." |

General-Purpose Computing Environment

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, and removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137.

Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

In some aspects, a pen digitizer 165 and accompanying pen or stylus 166 are provided in order to digitally capture freehand input. Although a direct connection between the pen digitizer 165 and the user input interface 160 is shown, in practice, the pen digitizer 165 may be coupled to the processing unit 110 directly, parallel port or other interface and the system bus 130 by any technique including wirelessly. Also, the pen 166 may have a camera associated with it and a transceiver for wirelessly transmitting image information captured by the camera to an interface interacting with bus 130. Further, the pen may have other sensing systems in addition to or in place of the camera for determining strokes of electronic ink including accelerometers, magnetometers, and gyroscopes.

It will be appreciated that the network connections shown are exemplary and other means of establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

A programming interface (or more simply, interface) may be viewed as any mechanism, process, protocol for enabling one or more segment(s) of code to communicate with or access the functionality provided by one or more other segment(s) of code. Alternatively, a programming interface may be viewed as one or more mechanism(s), method(s), function call(s), module(s), object(s), etc. of a component of a system capable of communicative coupling to one or more mechanism(s), method(s), function call(s), module(s), etc. of other component(s). The term "segment of code" in the preceding sentence is intended to include one or more instructions or lines of code, and includes, e.g., code modules, objects, subroutines, functions, and so on, regardless of the terminology applied or whether the code segments are separately compiled, or whether the code segments are provided as source, intermediate, or object code, whether the code segments are utilized in a runtime system or process, or whether they are located on the same or different machines or distributed across multiple machines, or whether the functionality represented by the segments of code are implemented wholly in software, wholly in hardware, or a combination of hardware and software.

Figure 1C:
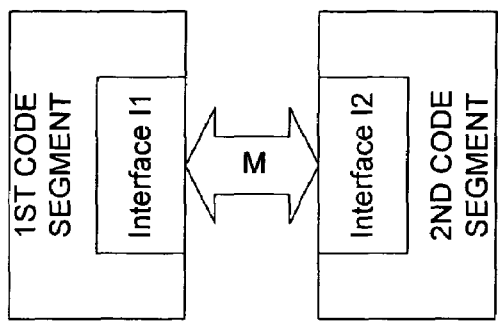
FIGS. 1B through 1M show a general-purpose computer environment supporting one or more aspects of the present invention.
Figure 1E:
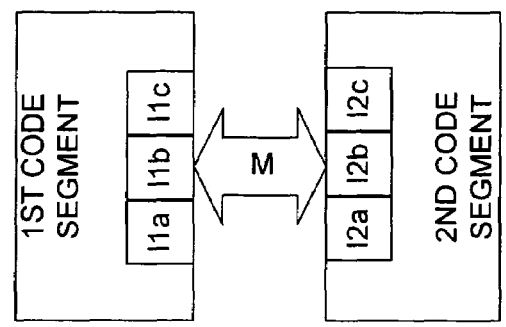
Figure 1B:
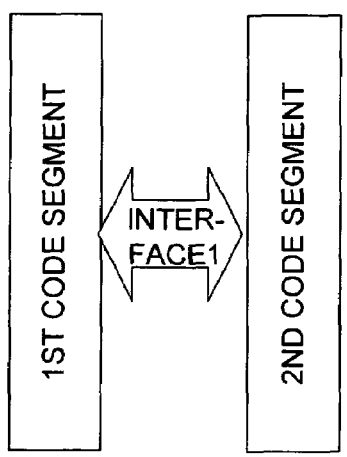

Notionally, a programming interface may be viewed generically, as shown in FIG. 1B or FIG. 1C. FIG. 1B illustrates an interface Interface1 as a conduit through which first and second code segments communicate. FIG. 1C illustrates an interface as comprising interface objects I1 and I2 (which may or may not be part of the first and second code segments), which enable first and second code segments of a system to communicate via medium M. In the view of FIG. 1C, one may consider interface objects I1 and I2 as separate interfaces of the same system and one may also consider that objects I1 and I2 plus medium M comprise the interface. Although FIGS. 1B and 1C show bi-directional flow and interfaces on each side of the flow, certain implementations may only have information flow in one direction (or no information flow as described below) or may only have an interface object on one side. By way of example, and not limitation, terms such as application programming interface (API), entry point, method, function, subroutine, remote procedure call, and component object model (COM) interface, are encompassed within the definition of programming interface.

Aspects of such a programming interface may include the method whereby the first code segment transmits information (where "information" is used in its broadest sense and includes data, commands, requests, etc.) to the second code segment; the method whereby the second code segment receives the information; and the structure, sequence, syntax, organization, schema, timing and content of the information. In this regard, the underlying transport medium itself may be unimportant to the operation of the interface, whether the medium be wired or wireless, or a combination of both, as long as the information is transported in the manner defined by the interface. In certain situations, information may not be passed in one or both directions in the conventional sense, as the information transfer may be either via another mechanism (e.g. information placed in a buffer, file, etc. separate from information flow between the code segments) or non-existent, as when one code segment simply accesses functionality performed by a second code segment. Any or all of these aspects may be important in a given situation, e.g., depending on whether the code segments are part of a system in a loosely coupled or tightly coupled configuration, and so this list should be considered illustrative and non-limiting.

This notion of a programming interface is known to those skilled in the art and is clear from the foregoing detailed description of the invention. There are, however, other ways to implement a programming interface, and, unless expressly excluded, these too are intended to be encompassed by the claims set forth at the end of this specification. Such other ways may appear to be more sophisticated or complex than the simplistic view of FIGS. 1B and 1C, but they nonetheless perform a similar function to accomplish the same overall result. We will now briefly describe some illustrative alternative implementations of a programming interface.

A. Factoring

Figure 1D:
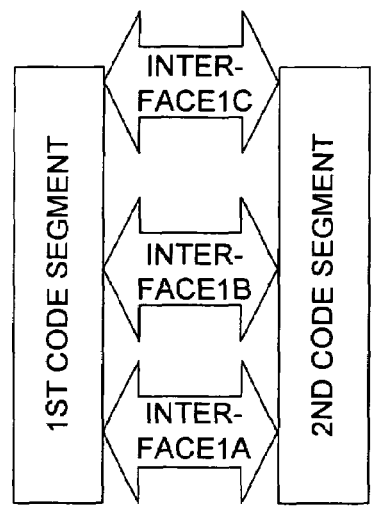

A communication from one code segment to another may be accomplished indirectly by breaking the communication into multiple discrete communications. This is depicted schematically in FIGS. 1D and 1E. As shown, some interfaces can be described in terms of divisible sets of functionality. Thus, the interface functionality of FIGS. 1B and 1C may be factored to achieve the same result, just as one may mathematically provide 24, or 2 times 2 times 3 times 2. Accordingly, as illustrated in FIG. 1D, the function provided by interface Interface1 may be subdivided to convert the communications of the interface into multiple interfaces Interface1A, Interface1B, Interface 1C, etc. while achieving the same result. As illustrated in FIG. 1E, the function provided by interface I1 may be subdivided into multiple interfaces I1a, I1b, I1c, etc. while achieving the same result. Similarly, interface I2 of the second code segment which receives information from the first code segment may be factored into multiple interfaces I2a, I2b, I2c, etc. When factoring, the number of interfaces included with the 1st code segment need not match the number of interfaces included with the 2nd code segment. In either of the cases of FIGS. 1D and 1E, the functional spirit of interfaces Interface1 and I1 remain the same as with FIGS. 1B and 1C, respectively. The factoring of interfaces may also follow associative, commutative, and other mathematical properties such that the factoring may be difficult to recognize. For instance, ordering of operations may be unimportant, and consequently, a function carried out by an interface may be carried out well in advance of reaching the interface, by another piece of code or interface, or performed by a separate component of the system. Moreover, one of ordinary skill in the programming arts can appreciate that there are a variety of ways of making different function calls that achieve the same result.

B. Redefinition

Figure 1F:
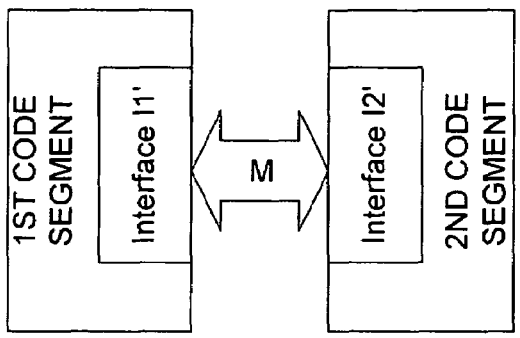
Figure 1G:
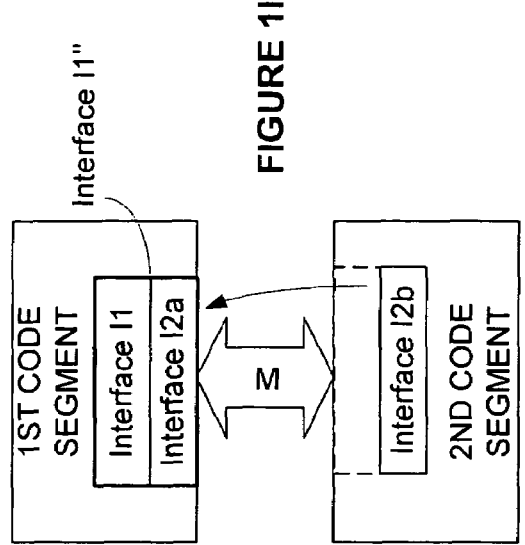

In some cases, it may be possible to ignore, add or redefine certain aspects (e.g., parameters) of a programming interface while still accomplishing the intended result. This is illustrated in FIGS. 1F and 1G. For example, assume interface Interface1 of FIG. 1B includes a function call Square (input, precision, output), a call that includes three parameters, input, precision and output, and which is issued from the 1st Code Segment to the 2nd Code Segment. If the middle parameter precision is of no concern in a given scenario, as shown in FIG. 1F, it could just as well be ignored or even replaced with a meaningless (in this situation) parameter. One may also add an additional parameter of no concern. In either event, the functionality of square can be achieved, so long as output is returned after input is squared by the second code segment. Precision may very well be a meaningful parameter to some downstream or other portion of the computing system; however, once it is recognized that precision is not necessary for the narrow purpose of calculating the square, it may be replaced or ignored. For example, instead of passing a valid precision value, a meaningless value such as a birth date could be passed without adversely affecting the result. Similarly, as shown in FIG. 1G, interface I1 is replaced by interface I1', redefined to ignore or add parameters to the interface. Interface I2 may similarly be redefined as interface I2', redefined to ignore unnecessary parameters, or parameters that may be processed elsewhere. The point here is that in some cases a programming interface may include aspects, such as parameters, which are not needed for some purpose, and so they may be ignored or redefined, or processed elsewhere for other purposes.

C. Inline Coding

Figure 1H:
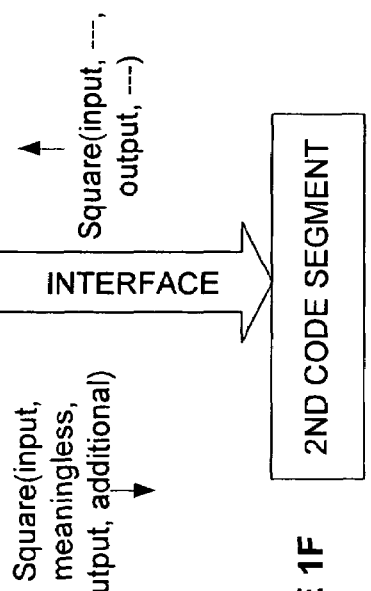
Figure 1I:
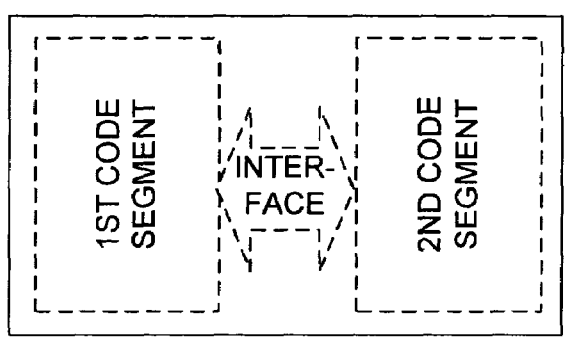

It may also be feasible to merge some or all of the functionality of two separate code modules such that the "interface" between them changes form. For example, the functionality of FIGS. 1B and 1C may be converted to the functionality of FIGS. 1H and 1I, respectively. In FIG. 1H, the previous 1st and 2nd Code Segments of FIG. 1B are merged into a module containing both of them. In this case, the code segments may still be communicating with each other but the interface may be adapted to a form which is more suitable to the single module. Thus, for example, formal Call and Return statements may no longer be necessary, but similar processing or response(s) pursuant to interface Interface1 may still be in effect. Similarly, shown in FIG. 1I, part (or all) of interface I2 from FIG. 1C may be written inline into interface I1 to form interface I1". As illustrated, interface I2 is divided into I2a and I2b, and interface portion I2a has been coded in-line with interface I1 to form interface I1". For a concrete example, consider that the interface I1 from FIG. 1C performs a function call square (input, output), which is received by interface I2, which after processing the value passed with input (to calculate the square of an input) by the second code segment, passes back the squared result with output. In such a case, the processing performed by the second code segment (squaring input) can be performed by the first code segment without a call to the interface.

D. Divorce

Figure 1K:
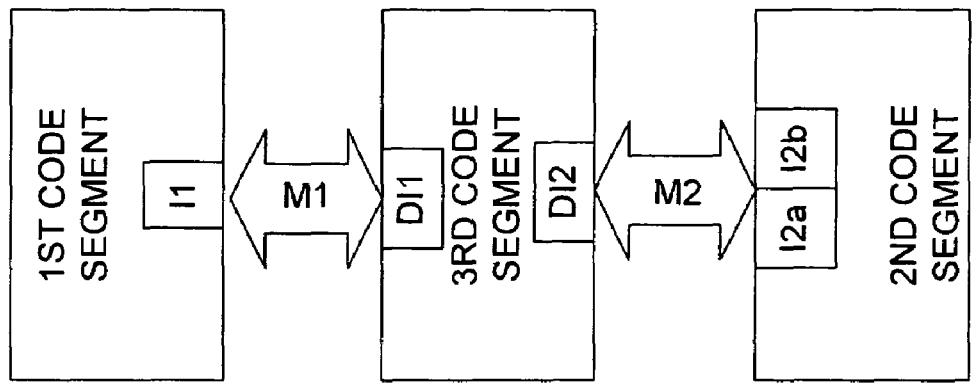
Figure 1J:
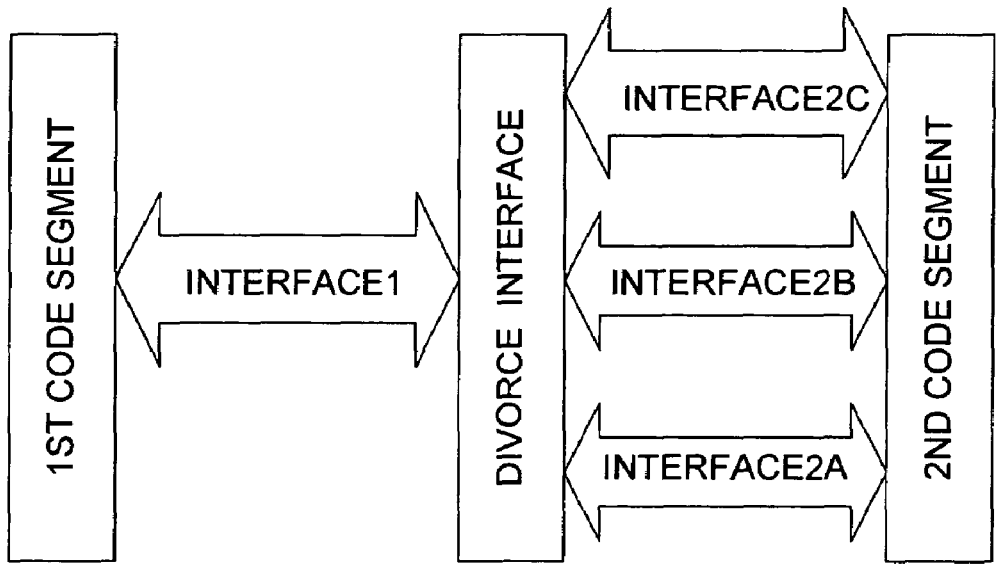

A communication from one code segment to another may be accomplished indirectly by breaking the communication into multiple discrete communications. This is depicted schematically in FIGS. 1J and 1K. As shown in FIG. 1J, one or more piece(s) of code (Divorce Interface(s), since they divorce functionality and/or interface functions from the original interface) are provided to convert the communications on the first interface, Interface1, to conform them to a different interface, in this case interfaces Interface2A, Interface2B and Interface2C. This might be done, e.g., where there is an installed base of applications designed to communicate with, say, an operating system in accordance with an Interface1 protocol, but then the operating system is changed to use a different interface, in this case interfaces Interface2A, Interface2B and Interface2C. The point is that the original interface used by the 2nd Code Segment is changed such that it is no longer compatible with the interface used by the 1st Code Segment, and so an intermediary is used to make the old and new interfaces compatible. Similarly, as shown in FIG. 1K, a third code segment can be introduced with divorce interface DI1 to receive the communications from interface I1 and with divorce interface DI2 to transmit the interface functionality to, for example, interfaces I2a and I2b, redesigned to work with DI2, but to provide the same functional result. Similarly, DI1 and DI2 may work together to translate the functionality of interfaces I1 and I2 of FIG. 1C to a new operating system, while providing the same or similar functional result.

E. Rewriting

Figure 1L:
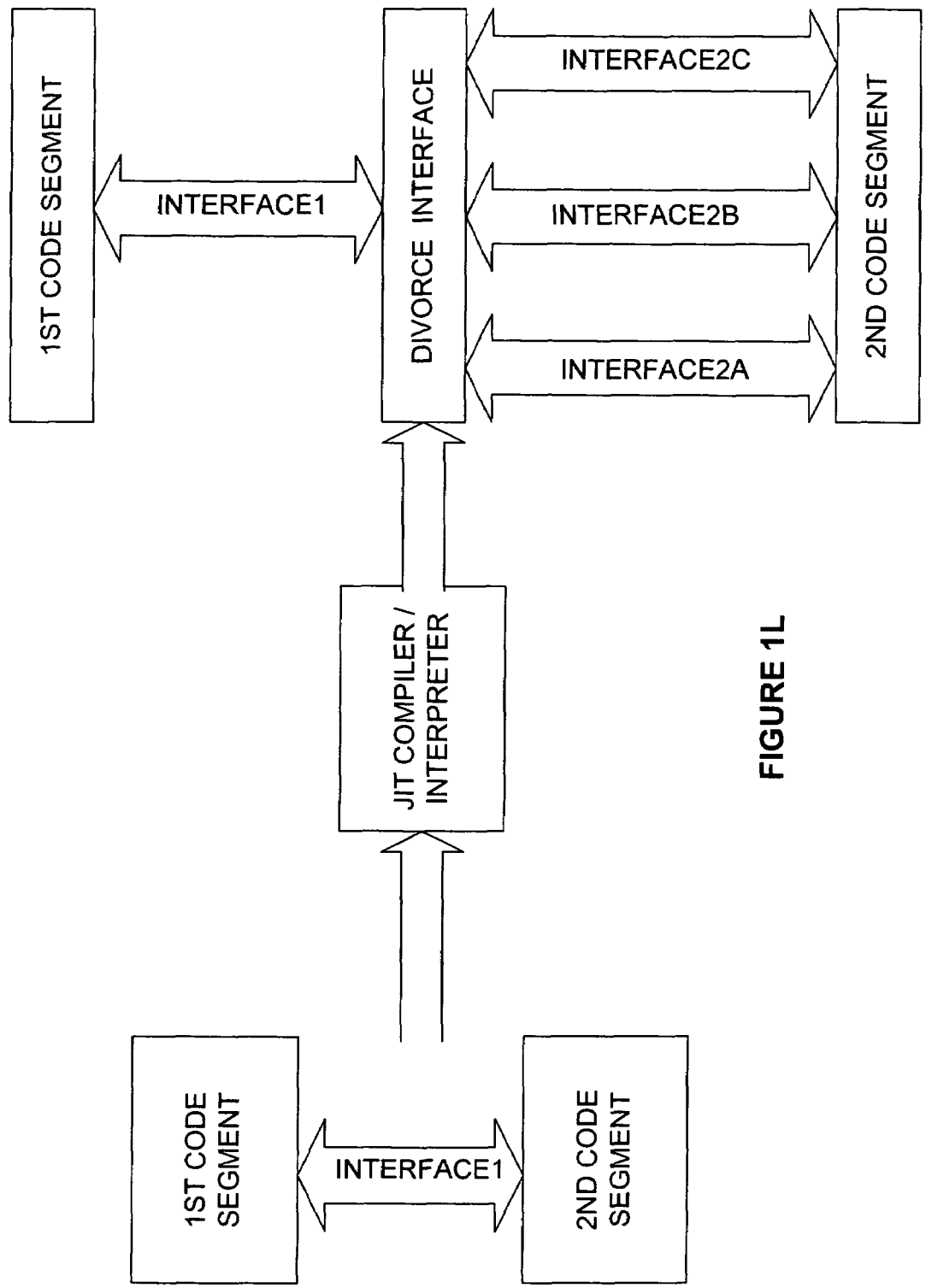
Figure 1M:
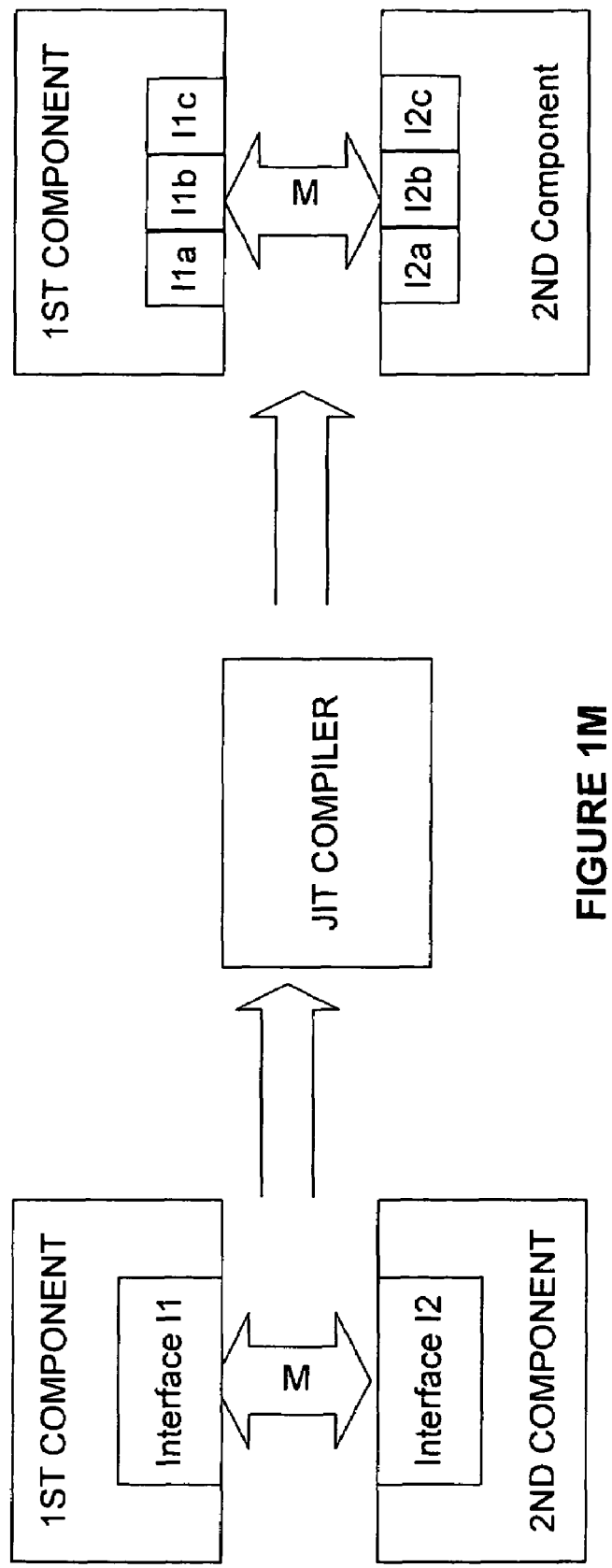

Yet another possible variant is to dynamically rewrite the code to replace the interface functionality with something else but which achieves the same overall result. For example, there may be a system in which a code segment presented in an intermediate language (e.g. Microsoft IL, Java ByteCode, etc.) is provided to a Just-in-Time (JIT) compiler or interpreter in an execution environment (such as that provided by the Net framework, the Java runtime environment, or other similar runtime type environments). The JIT compiler may be written so as to dynamically convert the communications from the 1st Code Segment to the 2nd Code Segment, i.e., to conform them to a different interface as may be required by the 2nd Code Segment (either the original or a different 2nd Code Segment). This is depicted in FIGS. 1L and 1M. As can be seen in FIG. 1L, this approach is similar to the Divorce scenario described above. It might be done, e.g., where an installed base of applications are designed to communicate with an operating system in accordance with an Interface1 protocol, but then the operating system is changed to use a different interface. The JIT Compiler could be used to conform the communications on the fly from the installed-base applications to the new interface of the operating system. As depicted in FIG. 1M, this approach of dynamically rewriting the interface(s) may be applied to dynamically factor, or otherwise alter the interface(s) as well.

It is also noted that the above-described scenarios for achieving the same or similar result as an interface via alternative embodiments may also be combined in various ways, serially and/or in parallel, or with other intervening code. Thus, the alternative embodiments presented above are not mutually exclusive and may be mixed, matched and combined to produce the same or equivalent scenarios to the generic scenarios presented in FIGS. 1B and 1C. It is also noted that, as with most programming constructs, there are other similar ways of achieving the same or similar functionality of an interface which may not be described herein, but nonetheless are represented by the spirit and scope of the invention, i.e., it is noted that it is at least partly the functionality represented by, and the advantageous results enabled by, an interface that underlie the value of an interface.

Figure 2:
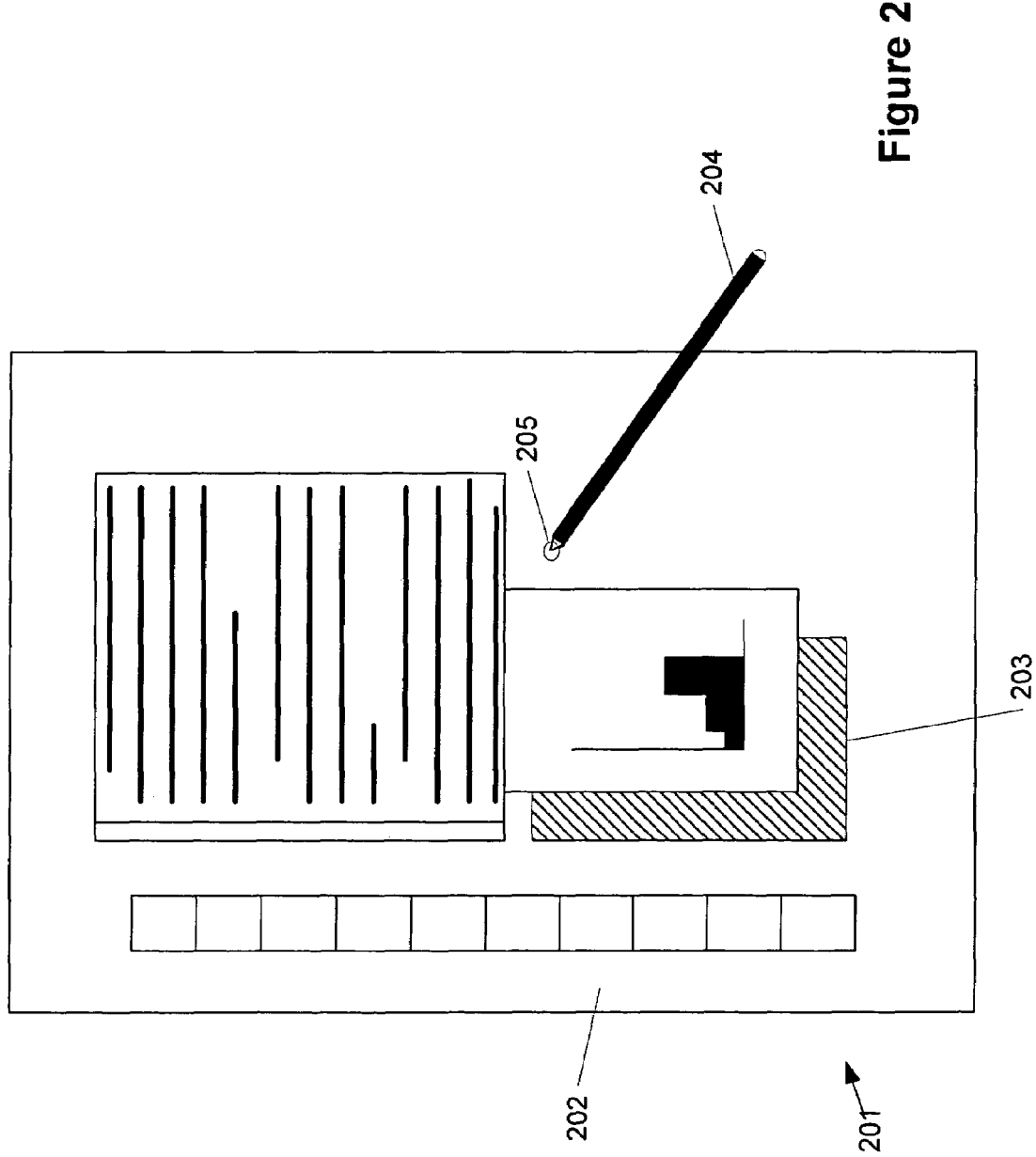
FIG. 2 shows an illustrative example of a tablet computer in accordance with aspects of the present invention.

FIG. 2 illustrates an illustrative tablet PC 201 that can be used in accordance with various aspects of the present invention. Any or all of the features, subsystems, and functions in the system of FIG. 1 can be included in the computer of FIG. 2. Tablet PC 201 includes a large display surface 202, e.g., a digitizing flat panel display, preferably, a liquid crystal display (LCD) screen, on which a plurality of windows 203 is displayed. Using stylus 204, a user can select, highlight, and/or write on the digitizing display surface 202. Examples of suitable digitizing display surfaces 202 include electromagnetic pen digitizers, such as Mutoh or Wacom pen digitizers. Other types of pen digitizers, e.g., optical digitizers, may also be used. Tablet PC 201 interprets gestures made using stylus 204 in order to manipulate data, enter text, create drawings, and/or execute conventional computer application tasks such as spreadsheets, word processing programs, and the like.

The stylus 204 may be equipped with one or more buttons or other features to augment its selection capabilities. In one embodiment, the stylus 204 could be implemented as a "pencil" or "pen", in which one end constitutes a writing portion and the other end constitutes an "eraser" end, and which, when moved across the display, indicates portions of the display are to be erased. Other types of input devices, such as a mouse, trackball, or the like could be used. Additionally, a user's own finger could be the stylus 204 and used for selecting or indicating portions of the displayed image on a touch-sensitive or proximity-sensitive display. Consequently, the term "user input device", as used herein, is intended to have a broad definition and encompasses many variations on well-known input devices such as stylus 204. Region 205 shows a feedback region or contact region permitting the user to determine where the stylus 204 as contacted the display surface 202.

In various embodiments, the system provides an ink platform as a set of COM (component object model) services that an application can use to capture, manipulate, and store ink. One service enables an application to read and write ink using the disclosed representations of ink. The ink platform may also include a mark-up language including a language like the extensible markup language (XML). Further, the system may use DCOM as another implementation. Yet further implementations may be used including the Win32 programming model and the .Net programming model from Microsoft Corporation.

Representation of Alternates

Figure 3:
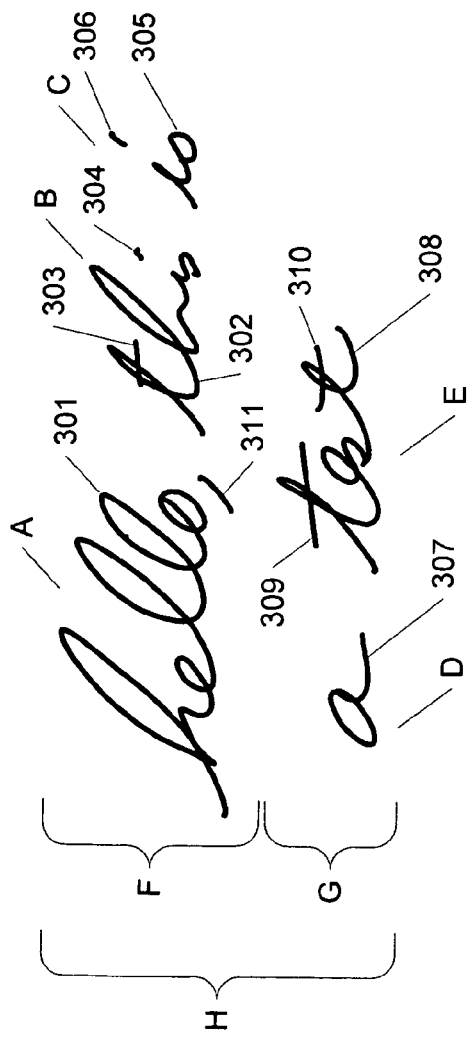
FIG. 3 shows an example of electronic ink in accordance with aspects of the present invention.
Figure 4:
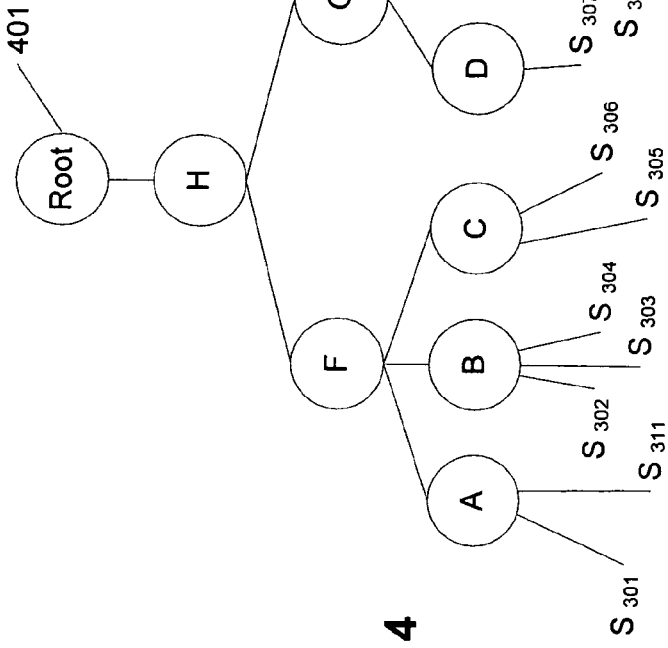
FIG. 4 shows an illustrative example of a context tree in accordance with aspects of the present invention.

FIG. 3 shows electronic ink that is parsed and represented as a tree in FIG. 4. The electronic ink of FIG. 3 is the phrase "hello, this is a test", with the five words of the phrase represented by labels A-E. The word "hello," A includes two strokes 301 and 311. The word "this" B includes three strokes 302-304. The word "is" C includes two strokes 305-306. The word "a" D includes one-stroke 307. The word "test" E includes strokes 308-309. The phrase occupies two lines F ("hello, this is") and G ("a test"). These lines together form paragraph H.

FIG. 4 represents an analysis of the electronic ink from FIG. 3. Root node 401 has a paragraph node H stemming from it. Paragraph node H includes line nodes F and G. Line node F includes word nodes A-C. Line node G includes word nodes D and E. each word node includes the strokes as described in FIG. 3. Each node A-H may be referred to as a context node. Each context node provides context for the other nodes for analysis, recognition, or other purposes. For instance, recognition of the strokes in node B may have one collection of results when the strokes are analyzed individually or with respect to all strokes of node B. However, the recognition results or ordering of the results may be different when an analysis of the strokes in node B includes an analysis (or previous analysis results) of the strokes from nodes A and C. Likewise, the recognition results may improve with the greater number of context nodes D-H that are included in the analysis of node B.

It is appreciated that various nodes may be used in addition (or replacing those above) including a sentence node (that contains an entire sentence), a list node (that contains a list), and a list item node (that contains an element of a list).

Figure 5:
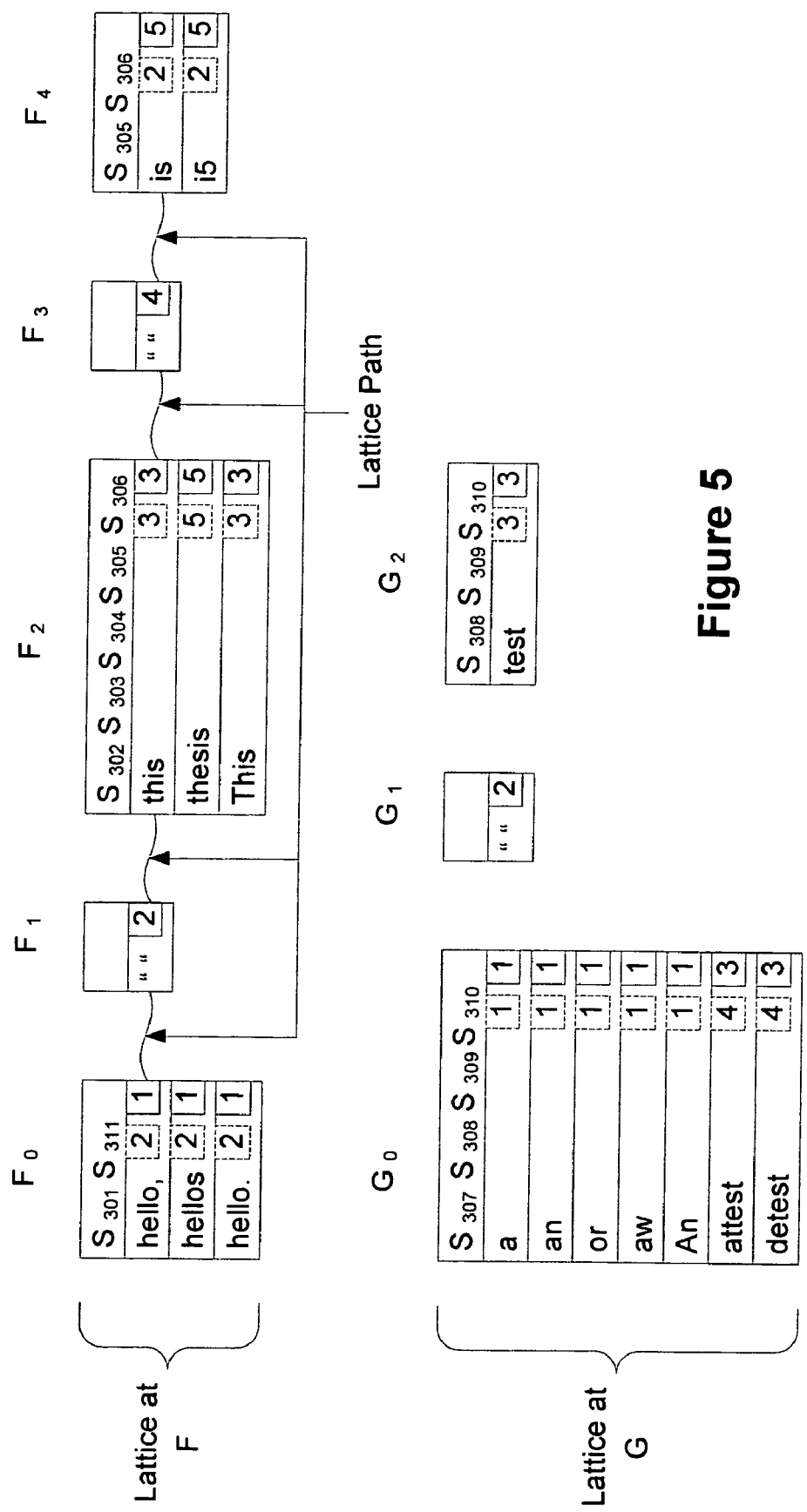
FIG. 5 shows an example of a lattice in accordance with aspects of the present invention.

FIG. 5 represents a lattice with alternates derived from the tree of FIG. 4. The lattice is a representation of a tree from a node level. For instance, the lattice may represent the tree from the line node level, from the word node level, from the paragraph node level and the like. In FIG. 5, a lattice exists for each line node. Each lattice includes columns (referred to as lattice columns). The columns represent the words associated with each line node (with each alternate referred to as a lattice element in the lattice column). Also, place holding columns (also referred to as spacing or null columns) may be placed between the words so as to help define relationships between the words.

The lattice at F includes five columns. Each column includes alternates that represent alternate recognition results from a recognition engine. Column $F_0$ represents the word "hello," as appearing in FIG. 3. Here, "hello" may be referred to as the top alternate. The lattice column includes reference to the strokes that make up the word (here, strokes $S_{301}$ and $S_{311}$). The lattice column $F_0$ also includes additional alternates (here, "hellos" and "hello."). Lattice column $F_2$ references strokes $S_{302}$-$S_{306}$ and includes entries for "this" and alternates "thesis" and "This". Lattice column $F_4$ references strokes $S_{305}$ and $S_{306}$ and includes entries for "is" and alternate "i5". Lattice columns $F_1$ and $F_3$ are separator (or spacer) columns. The lattice at G includes three columns. Lattice column $G_0$ references strokes $S_{307}$-$S_{310}$ and includes "a" and alternates {an, or, aw, An, attest, detest}. Lattice column $G_2$ references strokes $S_{308}$-$S_{310}$ and includes recognition result "test" and no alternates. Lattice column $G_1$ is a separator column.

A tree structure may contain one or more lattices. With respect to FIG. 5, the lattice at F and the lattice at G may be combined together into a larger lattice. The lattice as a combination of the lattice at F and the lattice at G may include a total of nine columns, with the ninth column being a separator column between the lattice at F and the lattice at G. Specifically, this new separator column may be added as separator column $F_5$. Likewise, one may separate lattices into smaller lattices. The separate lattices may be sent individually or in a group to a recognizer or queried for information. If a separator column starts or ends a smaller lattice, the separator column may be removed so that columns with content remain. Of course, separator columns may remain as an alternative approach.

The recognition results and alternates stored in each lattice column may be referred to as lattice elements. Each lattice element may include a designation of how many strokes were used to produce a recognition results. For instance, the second entry in lattice column $F_0$ "hellos" includes a designation (here, "2") that represents how many strokes were used to form the recognition result. For column $F_2$, the recognition result "this" used three strokes to form this result. However, the recognition result "thesis" used five strokes to form this result. Next, each lattice element includes a pointer to the next column. Here, the lattice elements of column $F_0$ point to column $F_1$. Similarly, the "this" lattice element of column $F_2$ points to column $F_3$ has the next column. However, the "thesis" lattice element of column $F_2$ points to no existing column (here, represented as column 5). Of course, the pointer of each lattice element to a nonexistent column may instead be a pointer to a predetermined column that represents the end of a lattice.

A designation of lattice elements among the columns may be referred to as a lattice path. The lattice path indicates a particular alternate recognition value (e.g., a storing a particular interpretation of ink).

Figure 6:
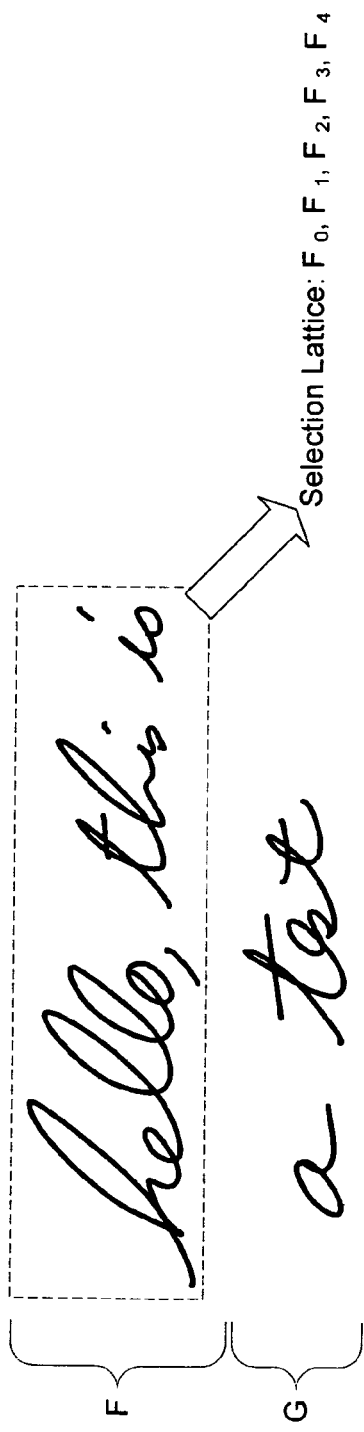
FIGS. 6-7 show selection lattices in accordance with aspects of the present invention.
Figure 7:
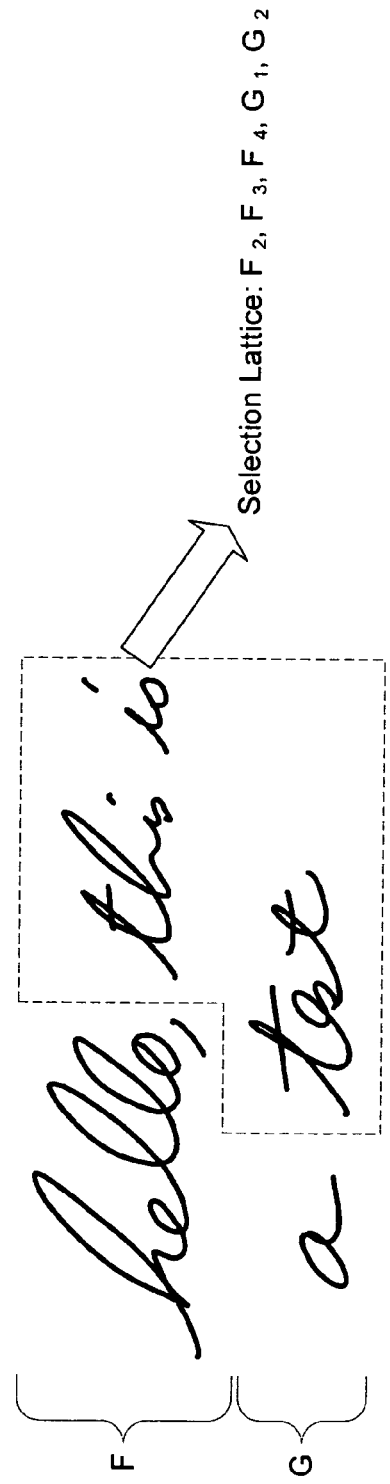

The lattice arrangement supports a representation of operations on selection across multiple words. FIG. 6 shows an example where a user has selected the words in line F. the resulting selection may be represented as a selection lattice (namely, a collection of selected nodes in the lattice). Here, the selection lattice includes columns $F_0$-$F_4$. FIG. 7 shows an alternate selection of words from two lines. Here, the selection includes {this is test} and the resulting selection lattice may include columns $F_2$, $F_3$, $F_4$, $G_1$, and $G_2$. Separator column $G_1$ may or may not be added in automatically to properly space columns $F_4$ and $G_2$ from each other.

The lattices of FIG. 5 were created based on the line level nodes of FIG. 4. Lattices may be formed at any of the levels of FIG. 4. FIG. 8 shows a lattice corresponding to paragraph node H. Here, a total of nine columns are shown. The lattice columns represent the word nodes of FIG. 4 and their alternates. The lattice of FIG. 9 shows a lattice corresponding to word node A.

FIG. 8 may or may not include separator column $H_8$ that separates the two lines.

This is because in some languages a separator string is not used between lines. For instance, in character-based languages (e.g., Chinese), spaces may not be used. In these situations, an empty character may be used in place of the separator column. A recognizer may provide the separator column or empty character as needed. For instance, in an ink sentence with English words followed by Japanese characters followed by more English words, one may parse and direct the various portions to appropriate recognizers (for instance, by identifying the ink with a language or recognizer). The English recognizer may return alternates bounded by separator spaces. The Japanese recognizer may return alternates bounded by empty characters.

The outputs may be merged so as to produce a single lattice with the combination of separator columns and empty characters separating the results from different recognizers. Of course, using recognizers that produce the same type of separating space/empty character (for instance, English and French recognizers) may result in only one separating space/empty character being stored, not two, as the same type of linguistic pattern is used.

Objects and Object Relationships

This section and the following section (Application Programming Interfaces) describe the objects, their relationships between each other, and interface for interacting with the various models.

Figure 10:
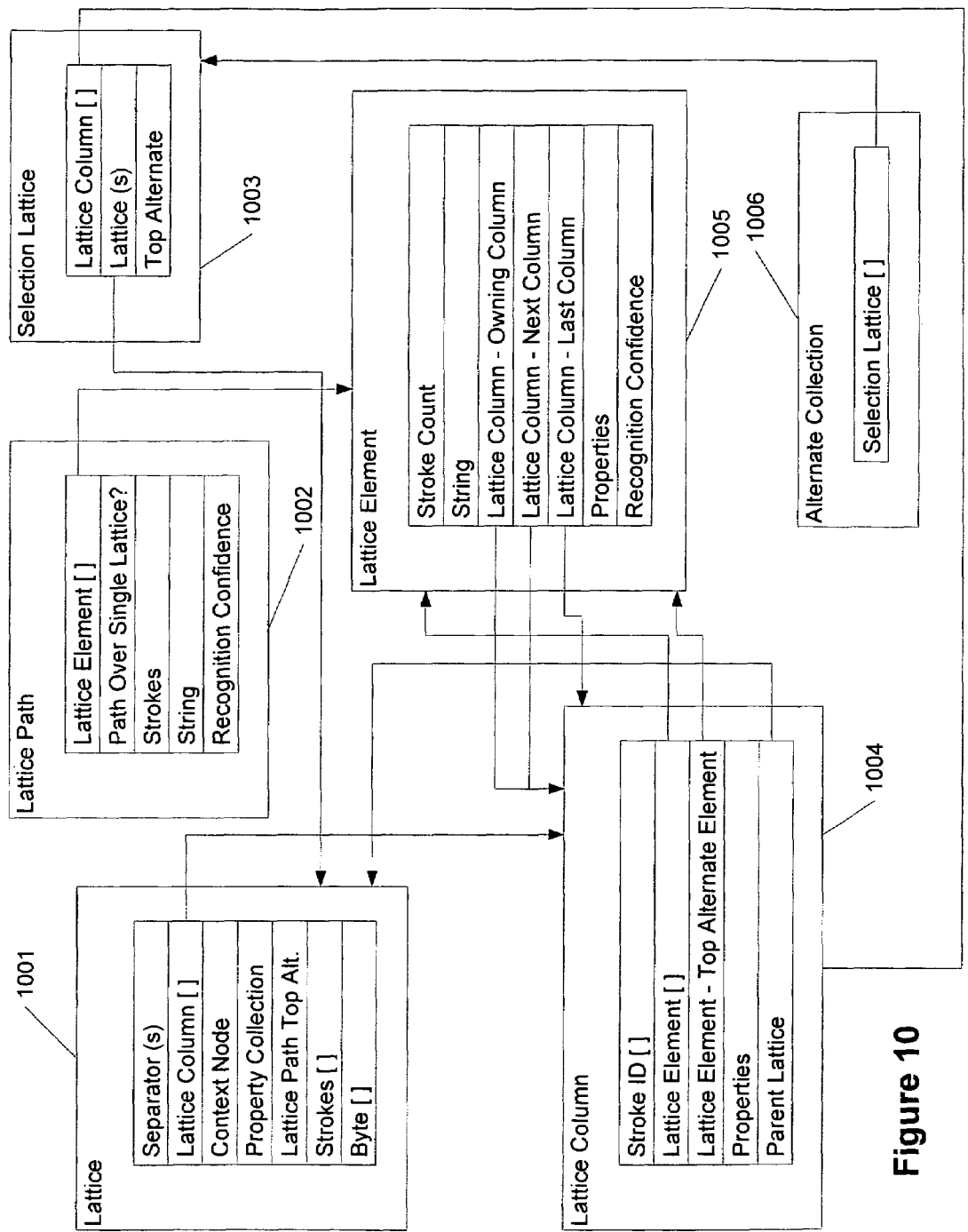
FIG. 10 shows object relationships in accordance with aspects of the present invention.

Various relationships exist between the lattice objects described above. FIG. 10 shows illustrative examples of these relationships. Some, all, or additional information may be included in each object described below.

Lattice 1001 is an object that may be created by a parser or recognizer. The lattice may be serialized so as to be easily accessed from a single node. One may access the entire lattice by requesting the lattice from the given node. One may obtain recognition data at different levels within the lattice by requesting information from the lattice object. One may create a lattice at any node by merging or splitting existing lattices. The lattice returned for a node may only reference strokes found under that node. To see all recognition data in a tree in a single lattice, one may request a lattice associated with a root node of a tree.

The lattice 1001 may include:
an indication of whether separators are present and optionally their identifications (the separators may be used when merging one lattice with another lattice. Merging lattices with separators may depend on the language— for instance, in English words are separated by a space but in Japanese, spaces do not need to be used);
a list of lattice columns (or a pointer to the first column);
a context node (that indicates where in a document lattice 1001 exists);
a property collection;
a lattice path top alternate;
strokes contained within the lattice, identifying a stroke by its identification value (or an index value of the stroke), or both; and
the size of the lattice.

Separators (left and right, up and down, and others) may be stored as part of a column or as disconnected columns within the lattice. These left and right separators generally only have a single element with the string data for the separator. These left and right separators are marked as the top alternate for these columns. However, they are not returned as an alternate when requesting alternates from the lattice. This allows for easier merging of alternates in the lattice. Alternatively, these separator columns may be returned or removed as needed.

Various methods may be performed on the lattice. These include:
requesting the strokes associated with the lattice;
requesting that the segmentation of the tree be updated based on interaction with the lattice (for instance, combining words);
requesting the lattice be serialized into a persistable format;
requesting the left or right separators; and
requesting the columns associated with specified strokes.

Lattice column 1004 is a column in the lattice. The lattice column generally corresponds to the segmentations in the lattice. Alternates are referenced by storing a pointer to the various lattice elements in each column. If the lattice element is the top alternate, then the column will reference the lattice element as the top alternate.

The lattice column may include:
an identification of strokes in the lattice column;
lattice elements contained within each column;
a top alternate element of the alternates within each column;
a property collection; and
a reference to the parent lattice.

The following methods may be performed on the lattice column:
requesting the strokes associated with the lattice column;
requesting the lattice associated with a lattice column;
requesting the elements associated with a lattice column; and
requesting or designating the top alternate element for the lattice column.

Lattice element 1005 may reside in each column. The lattice element is a portion of a lattice path. The lattice element stores the string data associated with a stroke or word. Strokes associated with a lattice element are generally taken from the beginning of the list of strokes associated with a lattice column. This allows another lattice column to contain a subset of strokes and have separate lattice elements associated with the subset. A lattice element may be designated by the lattice column as the top alternate for the column.

The lattice element may include:
a stroke count;
the data or string associated with the lattice element;
a reference to the lattice column that contains the lattice element;
a reference to a previous lattice column;
a reference to the next lattice column;
a property collection; and a recognition confidence level indicating how confident a recognition result is from a recognition engine.

Methods operable on the lattice element may include:

requesting the strokes associated with a lattice element;

requesting the parent lattice column for a current lattice column;

requesting a recognition confidence score associated with the lattice element (namely, how confident is a recognizer that ink was properly recognized);

requesting a next lattice column;

requesting a previous lattice column; and requesting the recognized string data from the lattice element.

Lattice path 1002 is a path through the lattice columns and includes a collection of lattice elements across multiple lattices. The lattice path may include:

a collection of lattice elements that make up the lattice path;

an indication whether the path extends over a single lattice;

strokes associated with the lattice path;

the recognition data or string associated with the lattice path; and a recognition confidence level indicating how confident a recognition result is from a recognition engine.

The following methods may be performed with the lattice path:

determine whether the lattice path extends beyond a single lattice;

request a collection of lattice elements;

requesting strokes associated with the lattice path;

request text based on a collection of strokes;

request information to be pushed to a specified string;

request strokes corresponding to a text range;

request strokes corresponding to nodes;

request a text range corresponding to strokes; and a recognition confidence level indicating how confident a recognition result is from a recognition engine.

Selection lattice 1003 is a logical entity that acts like a lattice but need not correspond to a single node.

Alternate Collection 1006 is an object that references the selection lattice. The alternate collection may include:

a selection lattice.

The following provides a sample of methods that may be useable with an alternate collection. Other methods are described below in the following sections:

request alternates from a lattice path; and request alternates for a context node.

The various objects may have methods associated with them as well. These methods may be called by an application programming interface (API). The following classes may be used to better handle information in a tree.

First, a method may be used to obtain alternates from an ink analysis engine. A first method on the ink analysis object includes a "get alternate" method which returns a collection of alternative objects for the entire tree, specified nodes, or specified strokes. Here, this method requests context nodes referencing supplied nodes. So, for instance, one may request alternates from a given line node. The system will respond with the collection of alternates, or at least a top-level alternate, for the given node.

A new class of objects (an analysis alternate class) may be provided. A method operable on the analysis alternate class may return a text recognition confidence level. Here, one may determine the level of confidence data in a lattice element. Also, another method operable on the analysis alternate class includes a "get recognized string" method. Here, this method obtains a recognition result associated with the lattice elements in this alternate's lattice path.

Second, an analysis alternate collection class of objects may also be used. This class includes a number of methods including a "get this analysis alternate", which may be the result of a returned value in the "get alternates" method on the ink analyzer above.

The following methods may be used with an analysis context tree. First, a "get alternates" method may be applied to the analysis alternate collection. This method may include a specification of the context nodes for which alternates are sought. Second, another "get alternates" method may be applied to the analysis alternate collection, but here the maximum number of alternates may also be specified. For instance, referring to lattice column $G_0$ of FIG. 5, one may request a few alternates as compared to the entire alternate collection associated with the lattice column.

A third "get alternates" method may request alternates for specified strokes to be returned.

Another method may include a "modify top alternate" method in which one may modify which alternate should be specified as the top alternate. For instance, if the user selected one alternate over another, the selected alternate may be considered the top alternate for future selections. Yet another method may include a "modify top alternate" method that automatically confirms the alternate selection so that it remains as the top alternate while other ink analyses occur around it. For instance, a user may select a new top alternate. The new top alternate may have a different segmentation of the tree. This new segmentation is taken as the preferred segmentation of the tree based on the selection of this alternate. The preferred segmentation alters the shape of the tree by altering the grouping of strokes and/or words. In this regard, each selection of a new alternate may ripple into a completely new tree.

Alternates may be obtained by passing nodes or strokes to the analysis context. These strokes need not be from contiguous portions of the context tree (see, for instance, FIG. 7 above). The ink analyzer object may return an array of leaf context nodes where the strokes in the nodes match the strokes or nodes passed via the GetAlternates( ) method. From these leaf nodes, the client can move its focus as it obtains parent or children nodes or strokes to explore the complete tree structure as if these nodes were in the top alternate.

A lattice alternate is a collection of string data for words and the strokes corresponding to those words, along with properties (recognition confidence, etc.).

The leaf nodes may be created one per word. To create parent nodes, one may consider multiple leaf nodes that may or may not stem from the same stroke collection. Non-leaf nodes may be further applied as alternates.

Application Programming Interfaces

Various application programming interfaces may be used with aspects of the invention. The following lists application programming interfaces and their functions.

The analysis context may be a root node in a tree. A set of methods directed to analyzing the ink in the analysis context may be exposed. The analysis context is the root node in the context trees described herein. The ink analyzer object that relates to the analysis context may expose at least two sets of methods.

First, a "get alternates" set of methods may be exposed. Here, the "get alternates" set may include a variety of definitions of which four are described here. GetAlternates(Context Node [ ] nodes) requests alternates from a context node or nodes (for instance, line, word, paragraph, or other nodes) and specifies the nodes for which the alternates are to be obtained. For example, as applied to FIG. 5, GetAlternates applied to node A would return the collection of "hello,", "hellos", and "hello." GetAlternates may also be applied based on specification of one or more strokes. For instance, GetAlternates applied to strokes $S_{302}$-$S_{304}$ may return the collection of "this", "thesis", and "This". The text returned may or may not include additional strokes. In the instance of "thesis", additional strokes $S_{305}$-$S_{306}$ may also be used.

The GetAlternates method may or may not include an indication of the maximum number of alternates to be returned. So, if the maximum number of alternates was set to two, then GetAlternates(node A) would return "hello," and "hellos". but not "hello."

Further, if no context node or stroke is specified, GetAlternates may return alternates for the entire analysis context.

Second, another method may include Modify Top Alternate. Here, the modify top alternate represents what the analysis context will look like if a selected alternate is applied. In the example of FIG. 5, if the alternate "thesis" is chosen, then the result from modify top alternate may include "hello, thesis a test". For each alternate returned in GetAlternates above, a different yet fully complete analysis context tree may be viewed. The get alternates and modify top alternates are views into the lattice described above. Further, modify top alternates can also modify the tree structure to match the segmentation of the newly selected alternate.

The alternate modification may include the ability to specify whether the alternate selection should prevent future analysis from replacing the current selection of an alternate. This specification may be, for instance, a Boolean argument specified in the call to the "modify top alternate" method as confirmation that the top alternate should be replaced.

Each alternate object returned from get alternates may reference an array of leaf context nodes for the set of strokes or nodes passed into the get alternates method. Using the get alternates method and other methods for obtaining strokes and nodes, a user may obtain parent and child nodes and strokes and evaluate how the tree will look if an alternate is applied.

The alternate trees may be created ahead of time or may be dynamically created once requested by the get alternates method. One advantage of waiting until after one has requested the alternates is that this approach minimizes unneeded creation of unwanted trees. In this latter approach, once the alternate object is created, it may only reference the relevant leaf ContextNodes. If the tree is further explored by the user, (by asking for the parent of a leaf node), each parent node may be dynamically created as requested.

The following methods may be used with the ink analyzer object. These methods aid finding nodes and converting between context nodes and strokes. StrokesToContextNodes takes a collection of strokes and returns an array of context nodes that reference the stroke. In a first approach, each stroke may be referenced by only one node (while parent and grandparent nodes may in turn reference the one node). Here, only a top alternate references a stroke. In an alternative approach, the combination of alternates in a reference a single stroke. In particular, more than one context node may reference a stroke (for instance, strokes $S_{305}$ and $S_{306}$ may be referenced by lattice columns $F_2$ and $F_4$, corresponding to nodes B and C). In these cases, StrokesToContextNodes may return the context nodes that reference the stroke. In responding to a StrokesToContextNodes method, the set of returned context nodes may or may not include nodes that contain strokes outside of passed strokes.

In some cases, the nodes may be all the same level. In other cases, the nodes may include a hierarchy of nodes (for example, including paragraph and root nodes). The hierarchy of nodes may be used to provide a complete picture of the context nodes that reference supplied strokes.

For instance, in FIG. 5, one may request nodes associated with strokes then all strokes associated with the returned nodes. If one started with stroke $S_{301}$, the result may include strokes $S_{301}$ and $S_{311}$. Likewise, if one started with strokes $S_{301}$ and $S_{306}$, the result may yield strokes $S_{301}$, $S_{311}$, $S_{305}$, and $S_{306}$.

The next method, ContextNodesToStrokes passes context nodes and returns a collection of strokes contained in the referenced context nodes. Word, line, and paragraph, and root nodes may be passed with this method. Other types of nodes may be included as well including music notation nodes, math nodes, drawing nodes, picture nodes, chart nodes, and nodes that define a writing region, an alignment level, and the like.

With respect to the analysis alternate class, three methods may be associated with the class. First, RecognitionConfidence allows one to retrieve the confidence of a recognizer with a result. Second, RecognizedString specifies the string value of an alternate. Using RecognizedString, one may request values of alternates associated with nodes without having to incrementally traverse the context nodes as described above. Third, GetProperty allows one to obtain any properties set on the lattice object by a recognizer of an object in the analysis alternate class (for instance, a recognition confidence). Here, one may specify a GUID or other identifying information and obtain the value of the property.

Two methods may be used to obtain information related to text ranges. First, a GetNodesFromTextRange allows one to obtain specific context nodes based on a text range. The text range may be the start and stop positions, the start and length information, or other representations of text ranges. Using the ink in FIG. 3 and the lattice at F in FIG. 4, one can map between a text range (7, 4) to obtain strokes 302,303,304. Where 7 means skip over the first 6 characters "hello," and 4 means take the next 4 characters. (716) would yield 302-306. The system may prevent the splitting of a word from the recognizer, so (0,1), (0,2), (0,3), (0,4), (0,5), and (0,6) will all yield s301, s311.

The second method GetTextRangeFromNodes allows one to obtain specific text ranges from supplied context nodes. From the supplied context nodes, one may receive start and stop positions, the start and length information, or other representations of text ranges. This method may expand a set of strokes to ensure that only complete words are included.

The context node objects may be the same. Alternatively, they may be different based on what node they reference. For instance, word and line-specific context nodes may have additional properties including values associate with strokes (for instance information relating to ascender, descender, midline, and baseline characteristics of the ink). The return values of these properties may include various points. For instance, a first point may describe the x,y coordinates of the start of the line. The second point may describe the x,y coordinates of the end point. The values may be calculated at the line level by using the start and end values of contained ink words or may be an average for the contained ink words. This may apply to line nodes, paragraph nodes, list nodes, and list item nodes, among others.

The system may support additional classes that relate to the status of an analysis of ink. For instance, the system may include an analysis status class. Here, an application may want to know if an analysis run was successful, without any errors. The results of the analysis operations may return an analysis status object that summarizes the state of the run. The object may include information regarding the success of the analysis. For instance, the object may include a simple Boolean representing the success of the analysis (for instance, "true" if the analysis run did not have any warnings or errors). If the run was not successful, the object may include a list of warnings and the impact of the warnings. The object may include a list of regions changed by the analysis.

Lattice Creation

FIGS. 11 and 12 represent ink 1101-1104 with ink 1103 having been selected and pinned to a recognition result (represented by box 1105). In some aspects of the present invention, the user may modify the lattice to precisely indicate what the recognition of a word should be. "Pinning" (also referred to as "confirmation of recognition results"), for example, means that the user has explicitly stated that some aspect of the analysis is correct. By indicating that some aspect of the analysis is correct, analysis engines may then use this definitive indication by the user to improve the analysis of other ink. The user typically pins when he or she explicitly corrects recognition results that the analyzer got wrong on its own. That is, the user specifies which alternate interpretation is correct.

Although it's true that the recognizer can use this context to improve recognition of nearby ink, it is also important that the recognizer will never revert to incorrect recognition results for the pinned ink itself. At various times, portions of the page may need to be re-analyzed (e.g. if another stroke is written nearby). In these cases, pinned ink would retain the corrected results, rather than reverting to the old, incorrect result, or some new, also incorrect result.

FIG. 11 shows handwritten ink including the phrase "Hi. How are you?" FIG. 12, shows a resulting set of analysis context trees in which the ink word "are" has been indicated by the user as properly recognized as the word "are". The resulting set of analysis context trees may be separated into the precisely identified word (here, "are") having its own context tree with other analysis context trees bracketing it.

FIG. 12 shows three analysis context trees. In the first analysis context tree, five nodes are shown include analysis context A, paragraph B, line C, ink word "Hi.", and Ink word "How" E. An alternate is shown as alternate 1 having paragraph node B', line C', and an alternate recognition of all strokes used to form ink words D and E as "Hello" D'.

Next, FIG. 12 includes a second analysis context tree having analysis context F, paragraph G, line H, and ink word "are" I. Here, the user has precisely identified (or "pinned") the ink word "are" I.

Finally, FIG. 12 includes a third analysis context tree having analysis context J, paragraph K, line L, and ink word "you?" M. Alternate 1 off of this analysis context tree includes paragraph K', line L', and ink word "yon" M'.

Alternatively, the three trees shown in FIG. 12 may be combined or remain as a single tree. For instance, if a user selects one alternate, that alternate may be fixed while the other alternates for other nodes may still be modified based on subsequent selections of alternates. Here, the nodes may remain as a single tree, as compared to separating the nodes into separate trees.

Analysis Hints

Analysis during handwriting recognition is often slow because of the complex analysis of shapes of the strokes and efforts to match patterns along with the number of values that a handwriting recognition program processes. As described herein, analysis hints minimize the possible list of text values for each field that parsers and recognizers use to recognize handwriting so there are fewer options to match against and, thus, a better chance of getting the correct recognition. More specifically, for each field a different analysis hint is constructed to describe the expected type of content. The field can be bound to some characteristic. A state field is bound to some list of know states. In one aspect, the present invention may be used to determine which strokes should be associated or bound to the available analysis hints. Depending on how this is calculated, it will determine the recognition values per analysis hint based on the number of strokes and the types of hints (word lists, guides, etc) associated with the analysis hint.

FIG. 13 shows an example of an electronic form that can be filled out using a stylus-based input device. The form includes text information 1301 (name 1302, address 1303, state 1304, country 1305, and telephone number 1306). After each set of text information 1301, a user has filled in each region 1307 with handwritten ink 1308-1314. Each of these fields has an expected input. For instance, in name field 1302, a person's name is expected, not numbers.

For each one of these fields 1307, a different analysis hint can be constructed to describe the expected type of content. The name field 1302 can be bound to all employee names in the company (for instance). The State field 1304 can be bound to the list of know states for a particular country. The country field 1305 can be bound to a fixed list of countries. And the telephone field 1306 can be bound to just numbers, no letters.

FIG. 14 shows how an analysis hint may be associated with a field. FIG. 14 includes two fields for receiving ink: a name field 1401 and an address field 1402. The name field 1401 has region 1406 associated with it encompassing an expected area in which a user will enter his or her name 1403. The analysis hint associated with region 1406 may be tied to a database of names. For instance, FIG. 14 relates to a company form, the analysis hint associated with field 1406 may be associated with a company database of employee names. The tying of the analysis hint to the database reduces the number of expected recognition alternates as well as making returned recognition results more accurate. In this regards, tying the analysis hint to the database provides the benefit the hint will add all employee names to the recognizer's dictionary. Without this addition, many proper nouns may be outside of the recognizer's vocabulary and never returned as an alternate. Here, the recognition results may be only employee names. Similarly, FIG. 14 includes address region 1402. The ink analysis hint associated with region 1407 may be a list of all address locations associated with employees of the company. Alternatively, the analysis hint may be tied to another database, for instance a database of all street addresses in a county, state, or country, to help limit the expected results while providing for different ways people enter information (for instance, One Main Street v. 1 Main St. v. 1 Main, etc.)

One of the primary applications of analysis hints may be with free-form, form filling applications. For example, one may scan in a government form (a tax or driver's license form) and associate various regions with a hint (for example, a zip code field may be inclined to recognize numbers only as based on an analysis hint associated with the field). In free-form fields, a user may sloppily allow his or her handwriting to spill from one field to another.

Analysis Hints as Context Nodes

As described above, analysis hints in some embodiments may be represented as context nodes in a context tree. Here, analysis hints may represent another type of non-ink context node. By including analysis hints in the collection of context nodes, one may easily associate the gap between ink content, non-ink content for annotations and hints. This is a more seamless integration for advanced users of the API.

The analysis hint class derives from the context node. The context node may take a number of forms including a root node, an inkword node, a stroke node, and an analysis hint node. Of course, other nodes are possible and may be used in place of these nodes (for instance, a sentence node in place of a line node). Also, the analysis hint may be implemented as something other than a context node and serve the same set of purposes.

Figure 15A:
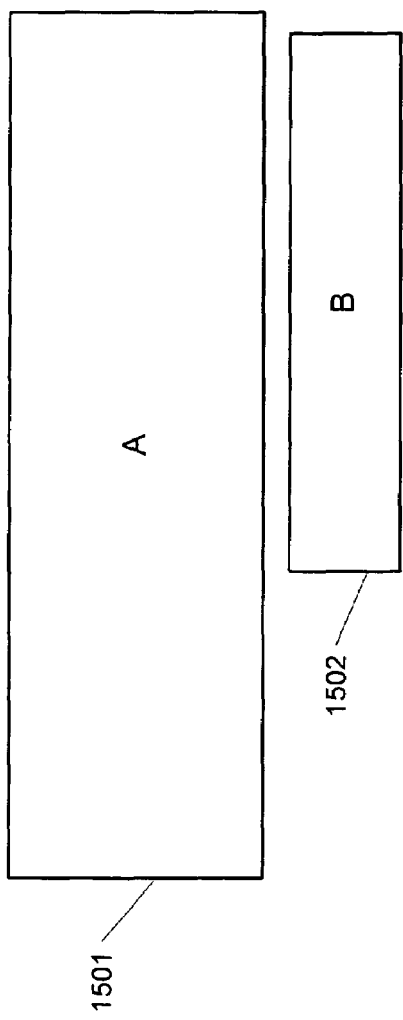
FIGS. 15A-15C show various arrangements of input regions in accordance with aspects of the present invention.
Figure 15B:
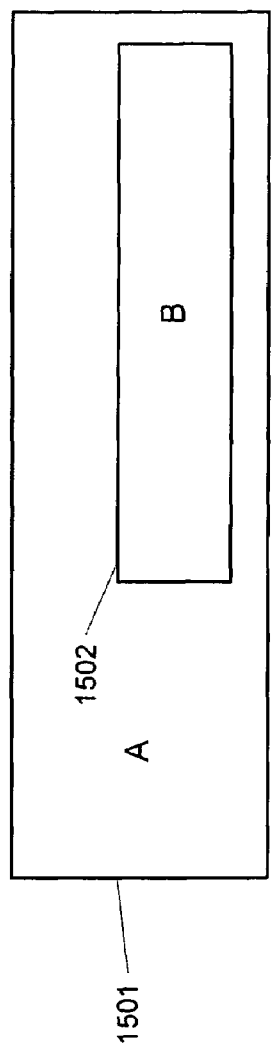
Figure 15C:
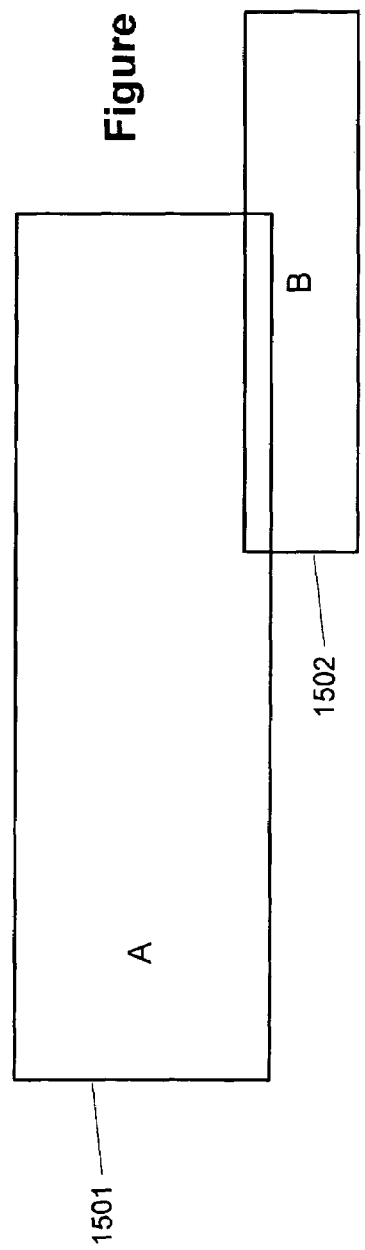
Figure 16:
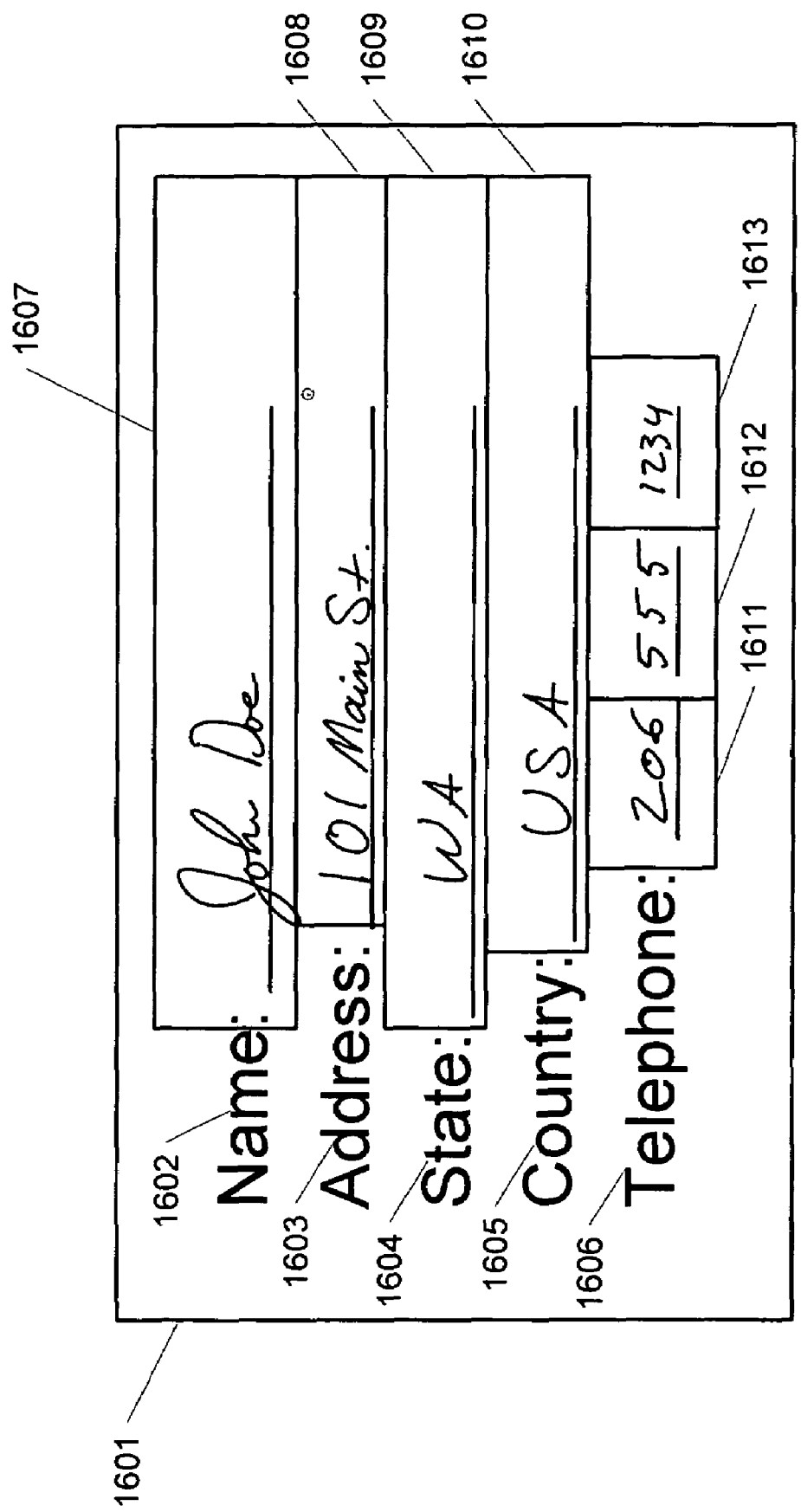

Another property of the analysis hint context node is a location property. The location property indicates where the analysis hint exists. For instance, the location property may indicate the size and location of input regions 1406 and 1407. FIGS. 15A-15C show various examples of how input regions may interact in their physical location. In FIG. 15A, input region A 1501 is separate from input region B 1502. Here, ink strokes fall into one of regions A 1501 or B 1502. In FIG. 15B, region B 1502 overlaps region A 1501. To address this conflict, region A 1501 's location may be set to 'global' or 'infinite', thereby having it act as a residual input region for strokes not associated with input region B 1502. Alternatively, the system may prevent regions from overlapping each other. This alternate approach may simplify the handling of the regions.

When a hint with a finite region intersects with the one hint that has an infinite region, the following may occur:

The properties of the finite hint override the properties of the infinite hint.

Any of the properties of the infinite hint that are not set on the finite hint are set to value of the infinite hint.

For instance, the following table lists input regions, whether they intersect, values, and results. For reference, a factoid is a property associated with the analysis hint that indicates what type of input is expected. Factoids may include the following: Digit, Email, Web-related information (for instance a URL or Web address), FileName, One character, percent, PostalCode, upperchar, currency, and the like.

The Language ID is an identification of the language being used. For instance, American English may be listed as a first ID and German list as a second ID.

The recognition engine and/or the analysis engine can create a context link (also referred to herein as a ContextLink) between the AnalysisHint ContextNode and the highest common parent ContextNode of the data associated with the analysis hint. Alternatively, the content link may also link to lower ContextNodes. A context link (ContextLink) allows one to access strokes once one knows the name of the analysis hint node (by being able to use the context link to traverse the context tree to arrive at the strokes). Similarly, one can determine recognition results from knowledge of the strokes (here, one can hit test the stokes to determine with which analysis hint they are associated and then traverse the context tree based on the context link to arrive at the recognition results for the ink). In other words, a ContextLink is a way of expressing an association between otherwise unrelated ContextNodes in the tree. The association is one of a set of predefined or extensible relationships, each having specific meaning.

All of the above bindings can aid in the analysis of the handwriting recognition. By scoping down the possible list of text values for each field the parsers and recognizers used to recognize the handwriting will have fewer options to match against and thus a better chance of getting the correct recognition.

Various approaches can be used to associate strokes with analysis hints and their associated regions.

The following code sample is an illustrative example of an analysis hint-to-stroke association that may be used in accordance with aspects of the invention. Here, the system may group ink with an analysis hint or field based on the location of the ink compared to the field. For instance, if >50% of a bounding box of an ink word resides in a field, then the system may consider the ink word to be associated with the field or analysis hint.

| Settings of Hint Region A 1501 | Settings of Hint Region B 1502 | Intersection? | Result |
| --- | --- | --- | --- |
| Factoid = web | Factoid = digit | No | OK - regions operate independently of each other |
| Factoid = web | Factoid = digit | Yes | Unclear which region takes precedence |
| Factoid = web Location = infinite | Factoid = digit Location is fixed size | Yes | Region B overrides region A. Region A loses the web factoid for the region occupied by hint B |
| Factoid = web Location = infinite | Location is fixed size Override Language ID = ABC | Yes | Because Hint A has a factoid value and Hint B does not, Hint B will inherit the factoid value from infinite Hint A. However, hint B will have a separate language specified (here, override language ABC) |

```
// Establish the links between AnalysisHint nodes and
// the most common parent of all the nodes that
// belong to the hint
AddHintsLinks(page)
{
   For each hint in the list of hints for the page do
   {
      If the hint is not a global hint then
      {
         Clear node candidate list
         // First determine which leaf nodes belong to the hint
         For each leaf node in the page
         {
            If IsNodeInsideHint return true then
            {
               Add the node to the candidate nodes list
            }
         }
         // See if all the children of a container node are part of the hint
         While there are node candidates left do
         {
            Clear the votes
            Clear the list of parent nodes
            // Each node will vote for its parent
            For each node in the candidate node list do
            {
               If the node's parent is not null then
               {
                  If the votes list contain the parent node then
                  {
                     Increment the votes for the parent node
                     by 1
                  }
                  Else
                  {
                     Set the votes for the parent node to 1
                  }
                  If the parent node does not belong to the list of
                  parent nodes then
                  {
                     Add the parent node to the list of parent
                     nodes
                  }
               }
            }
            If any parent node has all its children linked to this hint then
            {
               Remove all the children from the list of candidate nodes
               for the hint
               Add this parent node to the list
            }
         }
         // Associate all the nodes in the candidate nodes for the hint list
         with link
         For each node in the list of candidate nodes for the hint do
         {
            Add the link between the node and the hint
         }
         // Clean up the hint by removing unused links
         For each link in the hint's list of link do
         {
            If the link is was not updated this time remove it
         }
      }
      Else
      {
         // This is the case of a global hint
         Add the link between the hint and the root node
      }
   }
}
// Node to Analysis Hint Association.
// Determines if the node is inside a hint.
// This is done by examining all the strokes associated
// with this node and check if enough portion of
// the strokes fall inside the location of the node.
Bool IsNodeInsideHint(node)
{
   Set the percentage inside variable to 0
```

```
   If the node is a hint node return false
   If the location of the node is infinite return true
   If the location of the node is empty return false
   If the node is a leaf node
   {
      If the node has strokes then
      {
         Set the count of points outside the hint to 0
         Set the count of points inside the hint to 0
         For each stroke of the node do
         {
            For each point of the stroke do
            {
               If the point in inside the hint then
               {
                  Increment the count of point inside the hint
               }
               Else
               {
                  Increment the count of points outside the hint
               }
            }
         }
         If the percentage of points inside the hint is greater than the
         threshold return true, otherwise return false.
      }
   Else if this is a container node
   {
      // If any of the node's children falls outside the hint return false
      For each subnode of the node do
      {
         If IsNodeInsideHint for the subnode returns false then
         {
            Return false;
         }
      }
      Return true;
   }
   Return false
}
```

Analysis Hint as a Type Specific Class

The analysis hint may be a type of class added to the available types of context nodes. An analysis hint instance specifies a location in an application's document space where a specific recognition or analysis classification is expected. For example, in a rectangular area where ink input is expected, such as a name field applications can specify that they only expect to have regular word written in this area. This reduces a recognition engine's chance of detecting drawings, lists, shapes etc. in this area.

A number of methods may be used with the analysis hints to obtain information from or push information to the analysis hints. The following is an illustrative list of the various methods that permit interaction with the analysis hint:

a. string GetRecognizedString( );
   1. This method retrieves the recognized string for one or more writing nodes associated to a specified hint. The method effectively walks all nodes referenced by the links and concatenates their recognized strings into one.
b. strokes FindStrokesAssociatedToHint( );
   1. This helper method walks all of the links associated to the analysis hint and returns a collection of all the strokes linked to the hint.
c. string Name {get;set;}
   1. This method specifies the name of the analysis hint.
   2. The string value for the name should be unique for each AnalysisHint in order to allow one to reference each analysis hint independently. Alternatively, while the names may be the same, alternative identifications may be used to identify each hint exactly (for instance, using separate ID numbers).
3. The name of the analysis hint may be specified by an application associated with the analysis hint or may be specified by the application developer as needed.
d. RecognitionGuide Guide{get;set;}
1. This property returns or specifies a recognition guide associated with the analysis hint. The recognition guide is the object that helps define the reduced set of possibilities to which ink may be recognized. For instance, the recognition guide may be a link to a database of employee names, a specification of numbers only, wordlist, factoid, and the like.
2. Any line or word ContextNode identified by the analyzer that falls in the location occupied by the analysis hint will only be recognized by recognizers that supported the stated recognition guide of this AnalysisHint.
3. The shapes (rectangles or other shapes) defined in the Guide should be restricted to the region of the containing AnalysisHint.
e. int OverrideLanguageId{get;set;}
1. This property returns or specifies the integer based language class identification (LCID) value associated with this AnalysisHint.
2. Any Line or Word ContextNode identified by the Analyzer that falls in the Location occupied by this AnalysisHint will only be recognized by Recognizers that supported the stated language of this AnalysisHint.
f. bool WordMode{get; set;}
1. This property relates to whether or not an analyzer should attempt to return a single word for a region associated with an analysis hint.
2. The default value is false.
g. bool CoerceToFactoid{get; set;}
1. This property (if true) causes the analyzer to force its result to confine to any factoid or wordlist value set in its related hint. For instance, if the factoid property is set to 'Wordlist', the Wordlist property set to a list of words, setting the CoerceToFactoid to true will result in only the words from the wordlist being returned as possible recognition values.
2. The default value is false.
h. bool AllowPartialDictionaryTerms{get; set;}
1. If true is returned, the recognizer is allowed to return partial words from the dictionary. Example, if the dictionary contains the word "hello", then "h", "he", "hel", "hell" and "hello" are all valid dictionary terms.
2. The default value is false.
i. string PrefixText{get; set;}
1. Returns or specifies the Prefix string to associate with an analysis hint.
2. Any Line or Word ContextNode identified by the Analyzer that falls in the Location occupied by this analysis hint will have the specified text as the prepended context when being recognized. For instance, if the prefix text is "hello", then it may help the recognizer know that the next word is mote likely to be "there" than "the."
3. If no value is set, " " the empty string is returned.
j. string SuffixText{get; set;}
1. Returns or specifies the Suffix string to associate with this analysis hint.
2. Any Line or Word ContextNode identified by the Analyzer that falls in the Location occupied by this AnalysisHint will have the specified text as the appended context when being recognized. If the suffix text is "morning", the previous word is more likely to be "good" than "god."
3. If no value is set, " " the empty string is returned.
k. AnalysisHint Clone( );
1. Returns a copy of the current AnalysisHint object.
l. string Factoid{get;set;}
1. Returns or specifies the factoid associated with this AnalysisHint. Factoids may include characters, numbers, percentages, currency, and the like.
2. Any Line or Word ContextNode identified by the Analyzer that falls in the Location occupied by this AnalysisHint will be recognized with the specified factoid of this AnalysisHint.
3. If no value is set, " " the empty string is returned.
m. WordList WordList{get; set;}
1. Returns or specifies the WordList object to associate with this AnalysisHint. Any Line or Word ContextNode identified by the Analyzer that falls in the Location occupied by this AnalysisHint will use the specified WordList when being recognized.
2. If no value is set, null is returned.

The ink analyzer may include several helper methods to aid in the creation, deletion and manipulation of AnalysisHint objects.
a. public AnalysisHint AddAnalysisHint( );
1. This method creates a new hint with an empty location. This method follows the same logic and behavior as calling InkAnlayzer.RootNode.CreateSubNode(ContextNodeType.AnalysisHint).
b. public void DeleteAnalysisHint(AnalysisHint hintToDelete);
1. This method deletes or removes the specified AnalysisHint.
c. public AnalysisHint GetAnalysisHints( );
1. This method retrieves all of the AnalysisHints that exist.
2. If not AnalysisHints exist, null will be returned.
d. public AnalysisHint GetAnalysisHint(string hintName);
1. This method retrieves the hint by name. The AnlaysisHint object exposes a name property which can be optionally set.
2. If a value is set, GetAnalysisHints(string hintName) will retrieve the hint if the names match.
e. public AnalysisHint GetGlobalAnalysisHint( );
1. This method retrieves the Global AnalysisHint.
2. The Global AnalysisHint is simply the one AnalysisHint in the alternate class that as an infinite location.
3. Only one Global AnalysisHint can exist.
4. If no ContextNodes exist with an infinite region, one may or may not be created and returned as desired by a developer.

If an AnalysisHint already exists that has an infinite location, that hint will be returned.

Analysis Hint And Ink Analysis

One application of analysis hints is in the realm of forms. The form factor and ability of stylus-based computers present an opportunity for people to enter and capture digital information on location with an ease of pen and paper. This form filling scenario has been a significant theme for stylus-based computing applications; it is a natural way of transitioning from paper form while having the benefit of digital format and storage.

For form filling scenarios, there are cases where handwritten inputs need to be converted to text (recognized) accurately at the time of input to reduce or eliminate data conversion later, e.g. in filling out driver license application form by an applicant. There are also cases where it is more important to quickly capture the information and allow conversion at later time, for example a doctor filling out information after diagnosing a patient. For the first cases, the form can be designed specifically for a stylus-based computer, e.g. with large gaps between fields so no ambiguity of which ink strokes belong to which field or by converting it in place so incorrect recognition can be detected and corrected right away.

For the latter cases, the goal is more toward quick input, thus there is no luxury of asking intermediate correction or having large gaps between fields. In fact, it may be preferable to retain the paper form format as much as possible to eliminate possible retraining/confusion on the part of the user due to layout change (scanned paper form).

Due to the density of fields in such forms, there is higher probability that a stroke meant for a field is partially written on nearby fields instead. This is especially true for ascenders, descenders, dots of "i"s or "j"s, "crosses" of "t"s, accent marks etc. FIG. 18 shows an example where ink bleeds from one field to a neighboring field. Here, form 1801 includes three fields 1802, 1803, and 1804. Ink 1805, 1806, and 1807 reside in the fields, respectively. However, ink 1806 "John" extends into field 1804. Likewise, ink from field 1804 spreads into both fields 1802 and 1803.

When the fields on the form are aligned horizontally or positioned next and close to each other, it is often the case that the user does not have enough room to fit all the necessary ink in the fields. This forces the user to start and/or end the ink outside and beyond the defined field. FIG. 19 shows an example of an email address form with field 1902 and password field 1903. Here, ink 1904 spreads beyond the bounds of field 1902. Similarly, ink 1905 spreads beyond the bounds of field 1905.

Thus, a simple containment algorithm is not always sufficient to determine where each stroke belongs. To support these scenarios, one can use layout analysis, usually used for free form ink analysis, to link ink with fields.

During a layout analysis, based on spatial and temporal information of strokes, the algorithm determines the structure (layout) of the ink document: what strokes make up a word, what words make up a line, and what lines make up a paragraph.

Having the correct layout, it then can be determined that the cross of the "t" and dot of the "i" in "Third St." (ink 1807) above is part of the "Street address" field 1804, and not part of "Last name" field 1802. Similarly the "hotmail.com" ink strokes 1904 are known to be part of "Email address" field 1902, and not "Password" field 1903.

Aspects of the present invention provide a way for developers to add "Analysis Hints" to specify the location and type of information expected on every field in a form. The hint is designed to assist a handwriting recognition engine (or handwriting recognizer) to recognize text more accurately, for example, if a number is expected in a field then a handwriting stroke is recognized as "9" instead of letter "g".

Free form layout analysis is part of an ink parser to determine the layout of a document: which strokes make up a word, which words make up a line, which lines make a paragraph etc. Ink analysis technologies in accordance with aspects of the present invention may be spatial only. Alternatively, analysis technologies in accordance with aspects of the present invention may further include both spatial and temporal information to determine the layout of a document regardless of writing orientation. In this regard, analysis accuracy increases with the density of writing or with the increased spacing of fields on a document. The form filling scenario usually produce less dense handwriting, thus potentially not enough information to do layout analysis with high accuracy. However, the existence of analysis hints can assist layout analysis to produce accurate layout analysis.

FIG. 20 shows an example of ink spatially closer to one field than another. Here, Form 2000 includes field 2001 (place of birth) and field 2002 (date of birth). Ink 2003 "Tacoma, Wash." is distant from yet in the same field 2001 as ink 2004 "USA". Next, date "May 5, 2004" 2005 resides in field 2002. Spatially, the ink "USA" 2004 is closer to ink "May 5, 2004" 2005, thus creating a second line of ink. Thus layout analysis based on spatial analysis alone makes two errors: undergrouping the first line (ink 2003) and over-grouping the second line (ink 2004 and 2005). These errors can be corrected by adding an analysis hint for each field.

Results of layout analysis can be used to associate ink strokes to a field more accurately by the following rules:

a. If more than half of a word region overlaps with a region of a field, then all strokes of the word are associated with the field. E.g. "Third" and "St" are associated with "Street Address" field on the FIG. 1 above, even though some strokes falls on other fields.

b. If majority (>80%) of strokes in a line overlaps with the region of a field, then all strokes of the line are associated with the fields. For example, in FIG. 2. the whole line of terrichudzik@hotmail.com are associated with the "Email address" field, even though part of the line is beyond the region.

c. If a line spans over several fields, then break line into multiple lines, one each for each field (prevent line overgrouping). And the reverse of this rule, if a multiple lines are inside a single field, merge the lines into a single line (prevent line undergrouping). FIG. 3 shows examples of both cases.

It is appreciated that the percentages provided herein are for example only. For instance, a majority (listed above as >80%) may alternatively range to >50% to 100% as a threshold. There is no predefined limit to the percentages. Rather, one may alter the values based on a user's handwriting skills to more accurately parse the user's handwriting. Alternatively, the percentages may be fixed by implementation of the system. In any event, the particular numbers are for illustration only.

Figure 17:
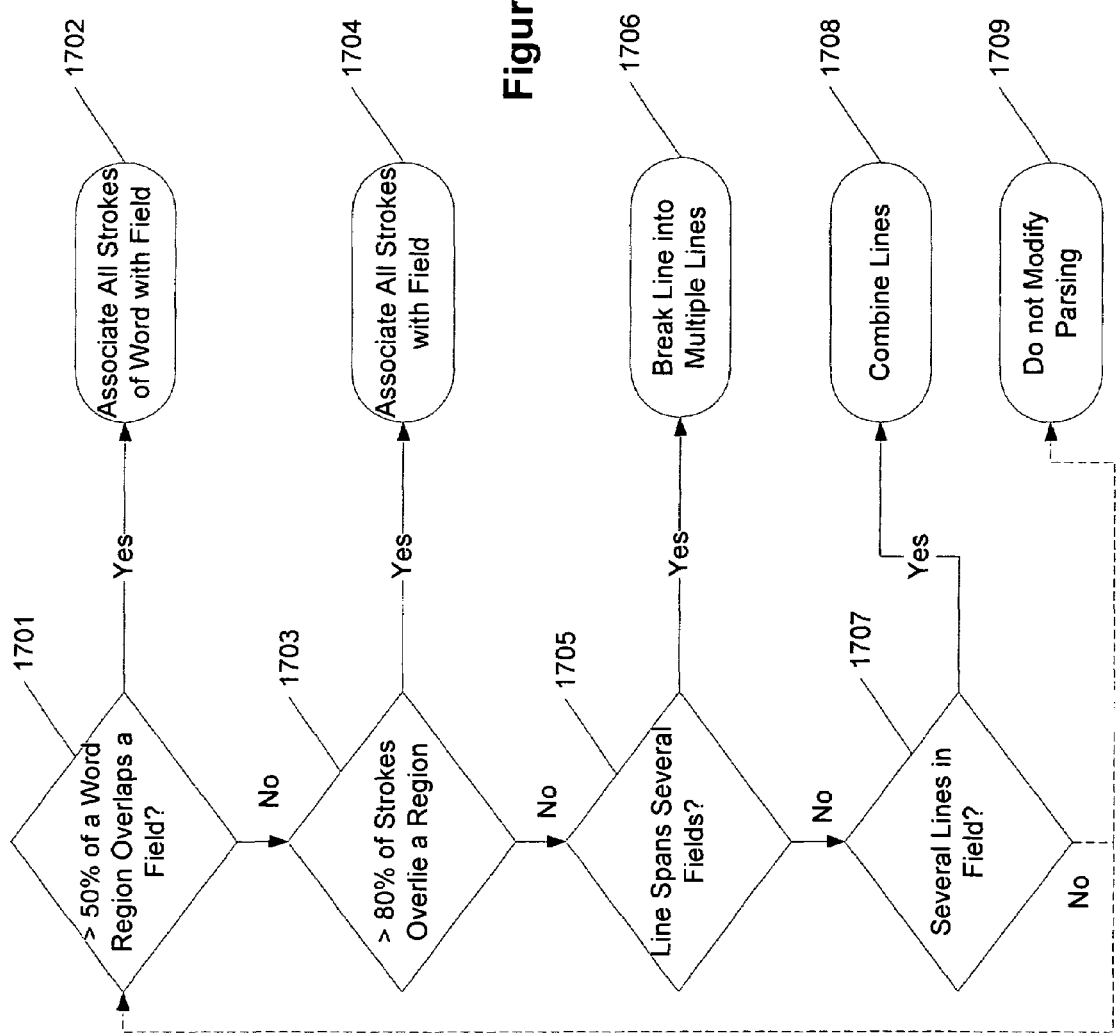
FIG. 17 show an analysis process for separating handwriting in accordance with aspects of the present invention.

These rules are represented in the flowchart of FIG. 17. In step 1701, the system determines whether >50% of a word region overlies a field. If yes, then the system associates all strokes of the word region with the field in step 1702. If no from step 1701, the system determines in step 1703 whether >80% of strokes overlie a region. If yes, then the system associates all strokes with the field in step 1704. If no, then the system determines if a line spans several fields in step 1705. If yes, then the system breaks the line into multiple lines in step 1706. If no, from step 1705, then the system determines if several lines are in a field in step 1707. If yes, then the system combines the lines in step 1708. If no, then the system repeats to step 1701 or does not modify the word analysis in step 1709.

The existence of Analysis Hints can be used to assist layout analysis as described below.

First, having analysis hints usually implies restricted handwriting. Orientations of lines inside and around the hint are usually similar to that of hints orientations. Having this information restricts the layout analysis to only produce such hypotheses, thus improving accuracy and performance. The following are errors that may be corrected using analysis hints.

a. Short word over grouping—In FIG. 21, two fields 2101 and 2102 are vertically juxtaposed to each other. Ink 2103 "Seattle" and ink 2104 "Ferrari" are incorrectly grouped as one word due to their temporal proximity.

b. Over grouping of lines due to time proximity—In FIG. 22, a user wrote ink 2202 in field 2201 but also created unrelated ink 2203 (a dot) outside of region 2201. Unrelated ink 2203 may have been created due to the user moving the stylus away and inadvertently contacting a display.

c. Line that go across hints—In FIG. 23, check marks 2304-2306 were made in fields 2301-2303, respectively. A parser incorrectly grouped the checkmarks thinking that they were all part of the same line of ink. In other words, check marks of forms that have lines of boxes are often grouped incorrectly by the parser in the same line. Here, the parser should break the line that goes across multiple hints (aligned horizontally or vertically).

Second, a single analysis hint signifies a unit of layout structure. Thus, if several structures exist in one analysis hint, it should be evaluated whether combining them into one structure is also possible. If it is, then the combined structure is preferable.

FIG. 3 and FIG. 24 illustrate this point. In FIG. 24, field 2401 includes ink 2402 and 2403. Because of the size and shape of the ink, a parser may miss the grouping of the ink. Having an analysis hint suggests to the parser that ink in the field should be combined into a single line. Here, the ink 2402 and 2403 can be merged together to form a single line in a singular hint region 2401.

Third, when an analysis hint exists for a recognizer having a single word mode, then a parser may coerce the strokes in the hint region to be forced into a single word. FIG. 25 shows password field 2501 with first ink 2502 and second ink 2503. The analysis hint coerces the two inks 2502 and 2503 into a single word.

Fourth, analysis hints may include language IDs. This helps the parser keep words of different languages separate. As shown in FIG. 26, region 2609 with ink 2601-2605 has a first language ID associated with its analysis hint, region 2610 with ink 2606-2607 has a second language ID associated with its analysis hint, and region 2611 with ink 2608 has a third language ID associated with its analysis hint, resulting in the ink of different language IDs remaining separate and recognized in the languages associated with the language IDs of the analysis hints.

Figure 27:
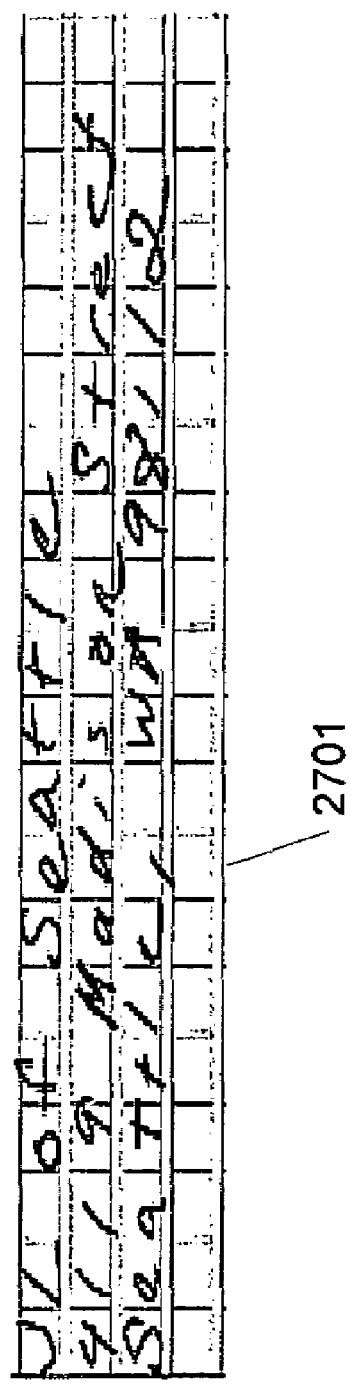
Figure 28:
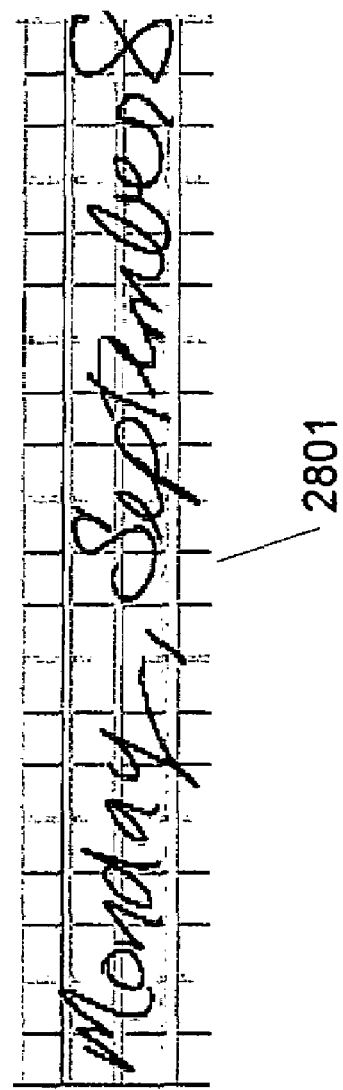

Fifth, recognition guides are regions into which users enter single characters. As shown in FIG. 27, Analysis hints with recognition guides 2701 allow a developer to provide a more specific layout (lines and columns) to indicate to the recognizer that the lines are broken into individual characters. The existence of this recognition guide can also be used by the parser's layout analysis process to create structures (words, lines and paragraph) based on the recognition guide dimensions. However, when the strokes do not follow the guide 2801 as shown in FIG. 28, layout analysis still is able to fall back to its original algorithm to produce a correct result.

The present invention has been described in terms of preferred and exemplary embodiments thereof. Numerous other embodiments, modifications and variations within the scope and spirit of the appended claims will occur to persons of ordinary skill in the art from a review of this disclosure.

We claim:

1. A system for recognizing ink comprising:
an input device to capture ink representing handwritten characters input to an input field, wherein said input field is associated with an analysis hint that provides a context for analyzing ink based on type of content expected to be entered in said input field;
a processor to perform text recognition of ink related to said input field based on said context of said analysis hint associated with the input field.

2. The system according to claim 1, wherein said analysis hint is a factoid.

3. The system according to claim 1, wherein said analysis hint is a link to a database.

4. The system according to claim 1, wherein said ink is parsed into a context tree and said ink resides as a node in said context tree.

5. The system according to claim 4, said context tree including an analysis hint context node.

6. The system according to claim 5, said analysis hint context node including a context link that associates said node relating to said ink and said analysis hint context node.

7. The system according to claim 5, wherein said context tree contains at least one paragraph node and one root node.

8. A computer-implemented method for recognizing ink comprising the steps of:
receiving ink representative of handwritten characters input to an input field of an input device;
determining, via the computer, whether said input field is related to an analysis hint that provides a context for analyzing ink based on type of content expected to be entered in the input field; and
text recognizing said ink based on said context of said analysis hint related to the input field.

9. The method according to claim 8, further comprising the step of:
storing a recognition result in a context tree.

10. The method according to claim 9, wherein said analysis hint is stored as a node in said context tree.

11. The method according to claim 10, further comprising the step of:
adding a context link between said analysis hint and said recognition result.

12. The method according to claim 8, further comprising the step of:
storing ink in a context tree.

13. The method according to claim 12, wherein said analysis hint is stored as a node in said context tree.

14. The method according to claim 13, further comprising the step of:
adding a context link between said analysis hint and said ink.

15. A system for recognizing ink comprising:
means for receiving ink representative of handwritten characters input to an input field of an input device;
means for determining whether said input field is related to an analysis hint that provides a context for analyzing ink based on type of content expected to be entered in the input field; and
means for text recognizing said ink based on said context of said analysis hint related to the input field.

16. The system according to claim 15, further comprising:
means for storing a recognition result in a context tree.

17. The system according to claim 16, wherein said analysis hint is stored as a node in said context tree.

18. The system according to claim 17, further comprising:
means for context link linking said analysis hint and said recognition result.

19. The system according to claim 15, further comprising:
means for storing a link in a context tree.

20. The system according to claim 15, wherein said analysis hint is stored as a node in said context tree, said system further comprising:
means for context link linking said analysis hint and said ink.

21. A computer-implemented method for analyzing ink comprising the steps of:
receiving input ink captured by a handwriting input device, said input ink representing handwriting strokes input to one or more input fields of a plurality of input fields of an electronic document, wherein each input field is associated with an analysis hint that provides a context for analyzing ink based on a location and type of information expected to be input to that input field;
analyzing, via the computer, said input ink based on the analysis hints to determine an association between the handwriting strokes of said input ink and said one or more input fields; and
associating said input ink with at least one field among said one or more input fields based, at least, on results of said analyzing.

22. The method according to claim 21, wherein the type of content of an analysis hint is a factoid that comprises a settable property.

23. The method according to claim 21, wherein said input is stored in a tree.

24. The method according to claim 21, wherein the location of an analysis hint is a property that can be set to have an infinite input region or a finite input region.

25. The method according to claim 21, wherein, when said receiving step receives a single line of ink extending over two or more input fields, said associating step parses said single line of ink into two or more lines of ink in one of the input fields.

26. The method according to claim 21, wherein, when said receiving step receives multiple lines of ink in one input field, said associating step combines said multiple lines into a single line of ink in the one input field.

27. The method according to claim 21, wherein said analyzing step determines whether the handwriting strokes are associated with a given one of the input fields based on the expected content for said field.

28. A system for analyzing ink comprising:
means for receiving input ink captured by a handwriting input device, said input ink representing handwriting strokes input to one or more input fields of a plurality of input fields of an electronic document, wherein each input field is associated with an analysis hint that provides a context for analyzing ink based on a location and type of information expected to be input to that input field;
means for analyzing said input ink based on the analysis hints to determine an association between the handwriting strokes of said input ink and said one or more input fields; and
means for associating said input ink with at least one field among said one or more input fields based, at least, on results of said analyzing.

29. The system according to claim 28, wherein the type of content of an analysis hint is a factoid that comprises a settable property.

30. The system according to claim 28, wherein said input is stored in a tree.

31. The system according to claim 28, wherein the location of an analysis hint is a property that can be set to have an infinite input region or a finite input region.

32. The system according to claim 28, wherein, when said means for receiving receives a single line of ink extending over two or more input fields, said means for associating parses said single line of ink into two or more lines of ink in one of the input fields.

33. The system according to claim 28, wherein, when said means for receiving receives multiple lines of ink in one input field, said means for associating combines said multiple lines into a single line of ink in said one input field.

34. The system according to claim 28, wherein said means for analyzing determines whether the handwriting strokes are associated with a given one of the input fields based on the expected content for said field.

* * * * *